Jan. 7, 1947.    L. HAMMOND    2,413,870
RADIANT ENERGY DETECTING AND CONTROL APPARATUS
Filed Jan. 18, 1943    11 Sheets-Sheet 1
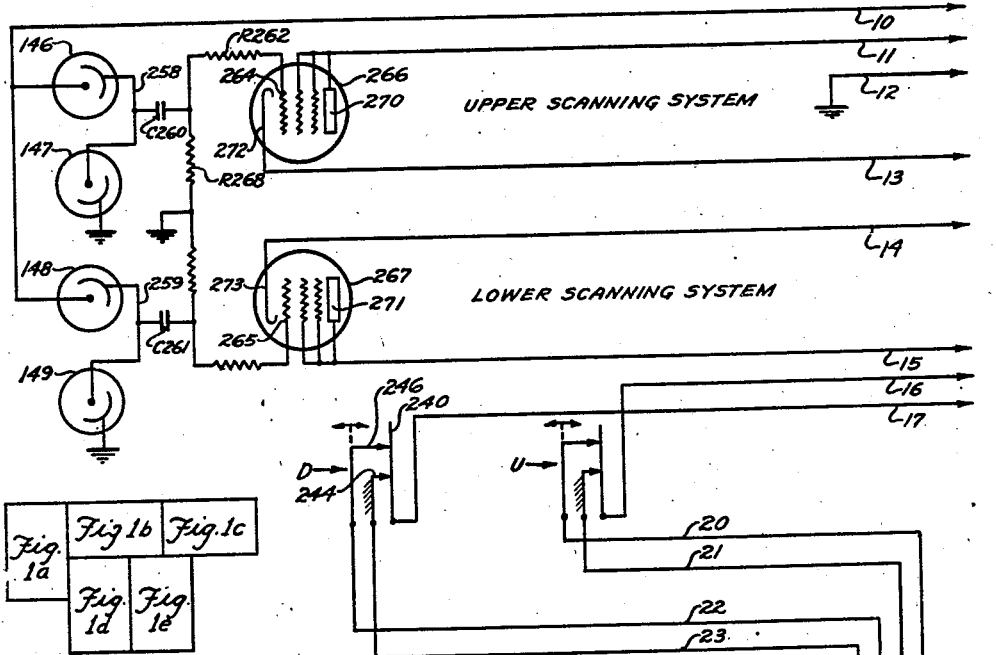
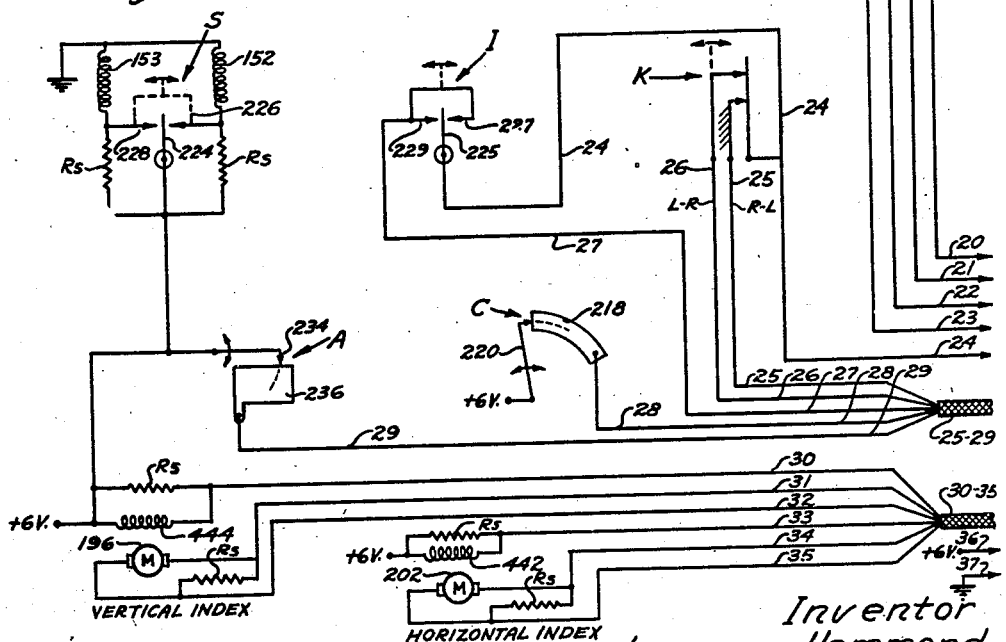
Fig. 1a
Inventor
Laurens Hammond
By Benjamin H. Hupper
Atty.

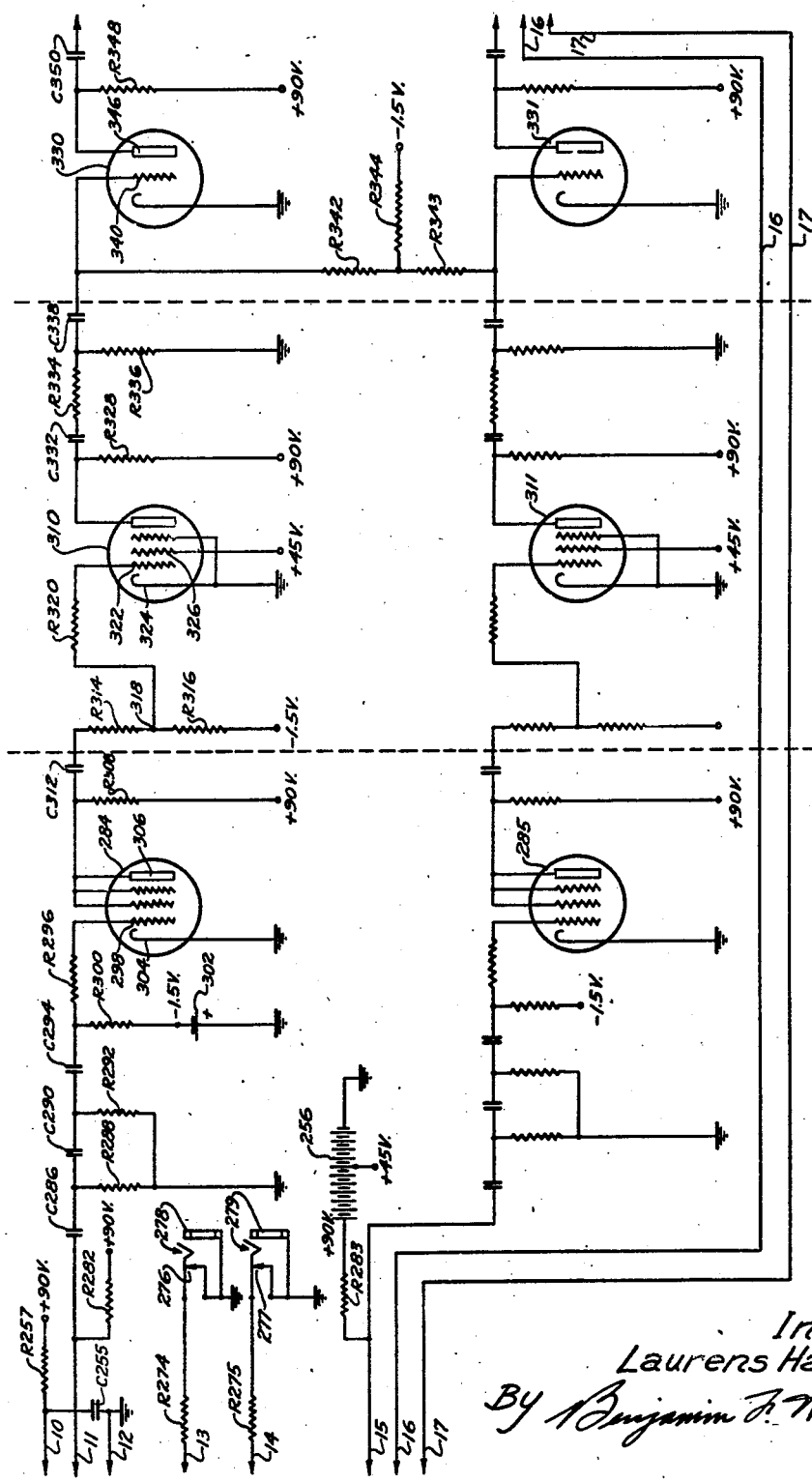

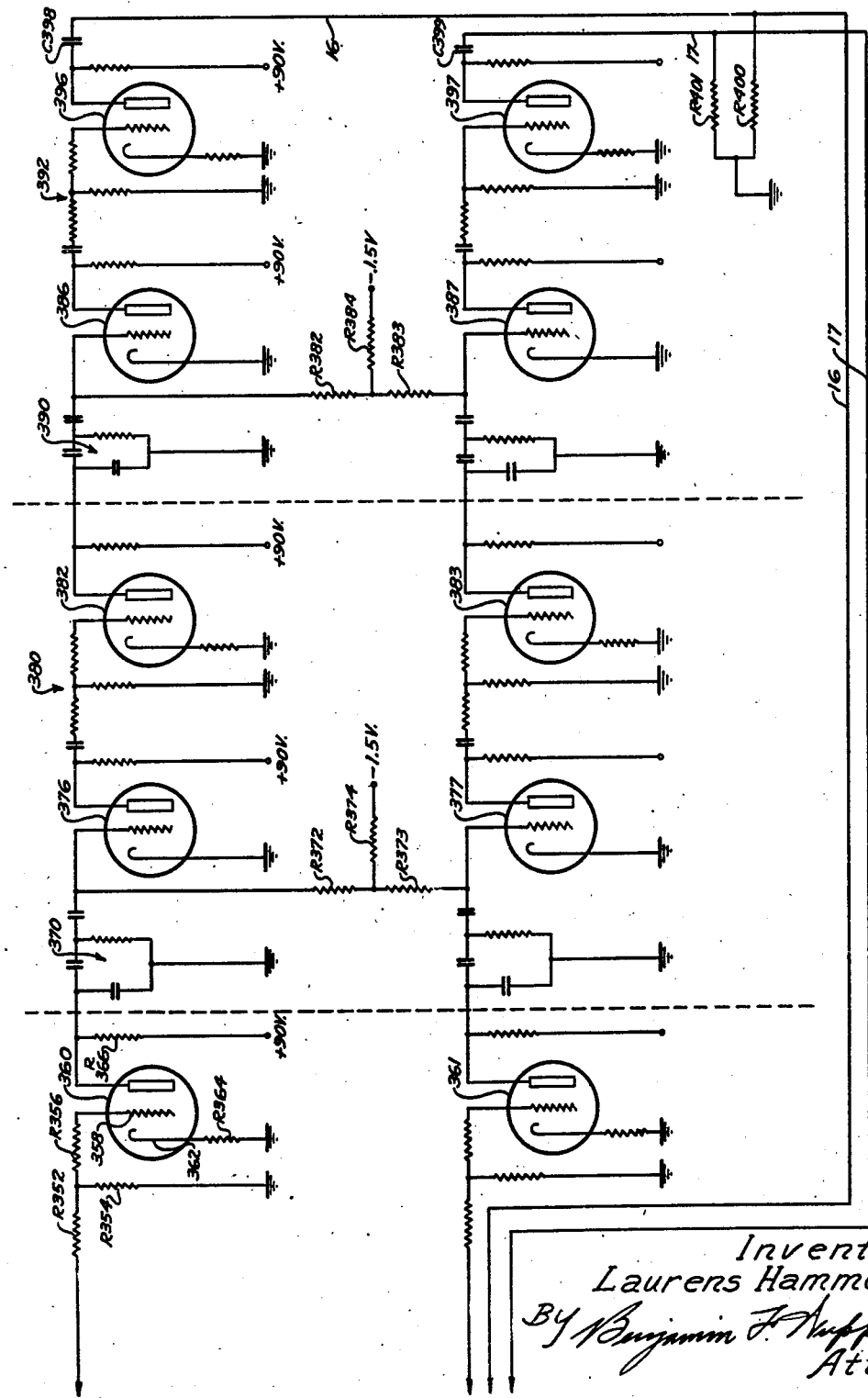

Inventor
Laurens Hammond
By Benjamin F. Wupper
Atty.

Jan. 7, 1947. L. HAMMOND 2,413,870
RADIANT ENERGY DETECTING AND CONTROL APPARATUS
Filed Jan. 18, 1943 11 Sheets-Sheet 5

Inventor
Laurens Hammond
By Benjamin F. Nupper
Atty.

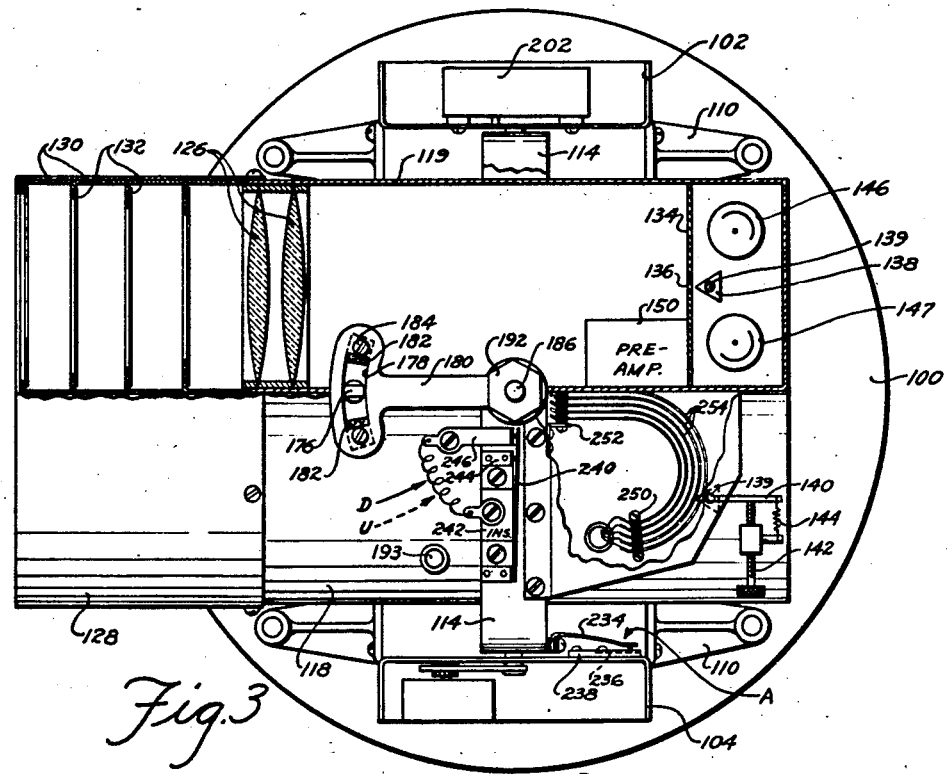
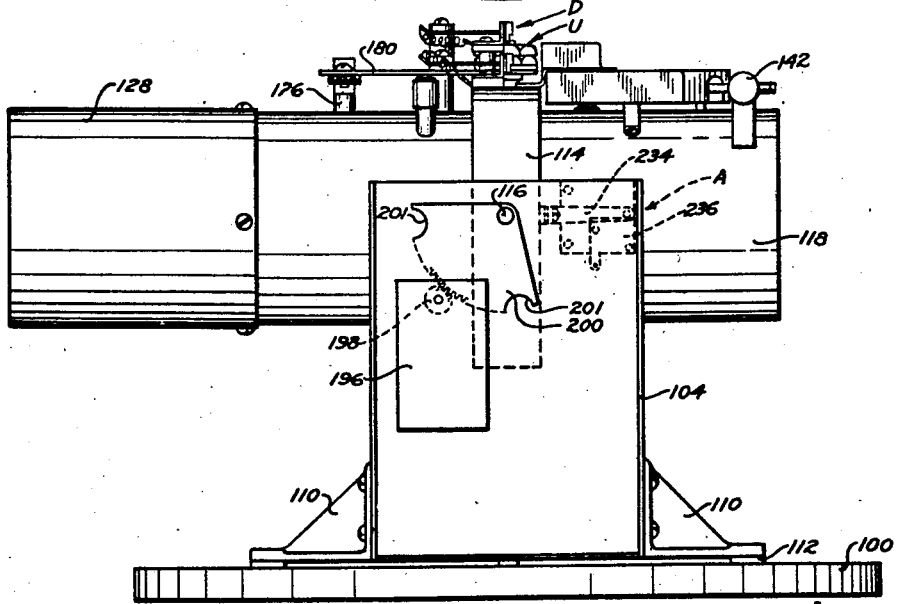

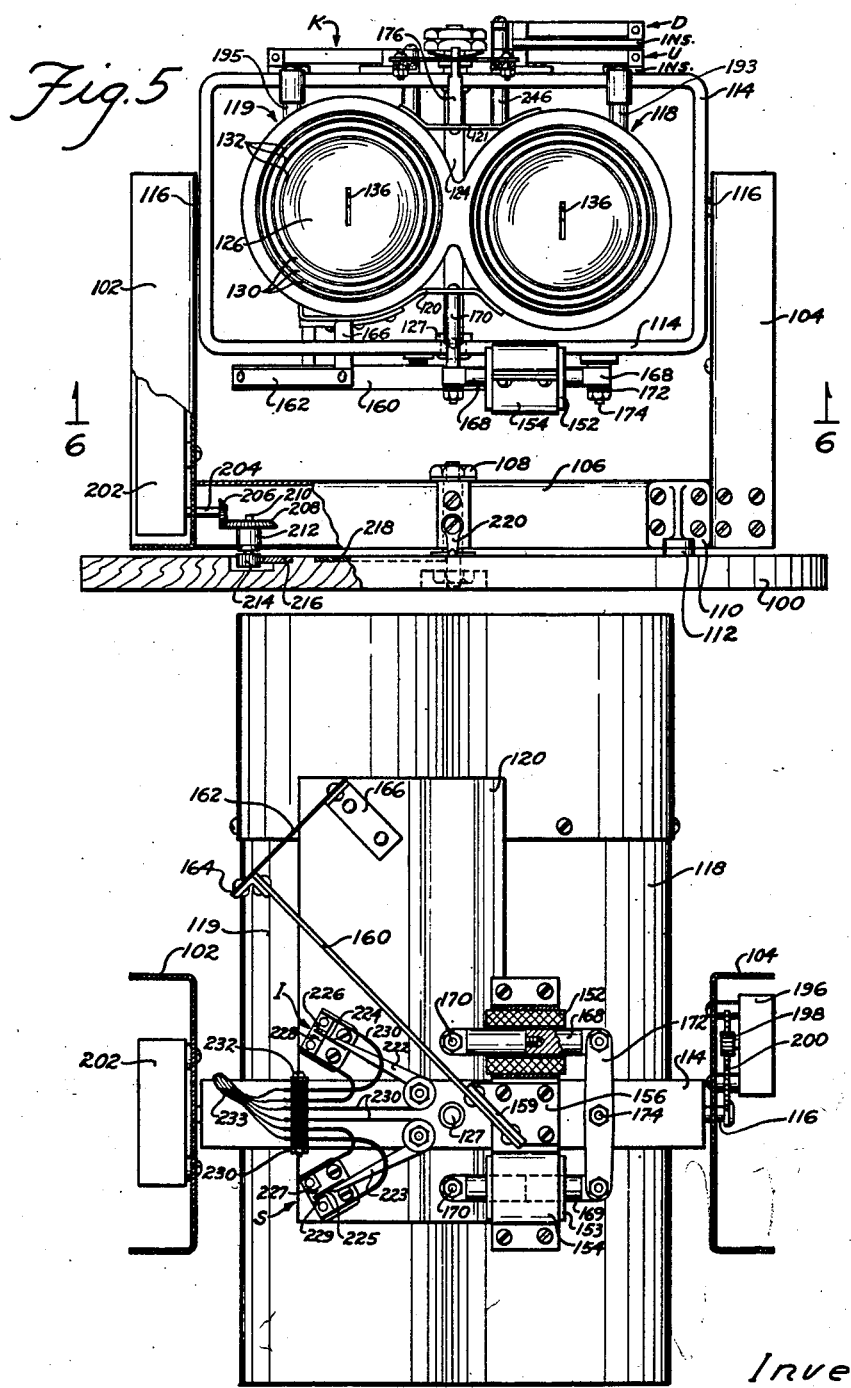

Jan. 7, 1947.     L. HAMMOND     2,413,870
RADIANT ENERGY DETECTING AND CONTROL APPARATUS
Filed Jan. 18, 1943     11 Sheets-Sheet 8
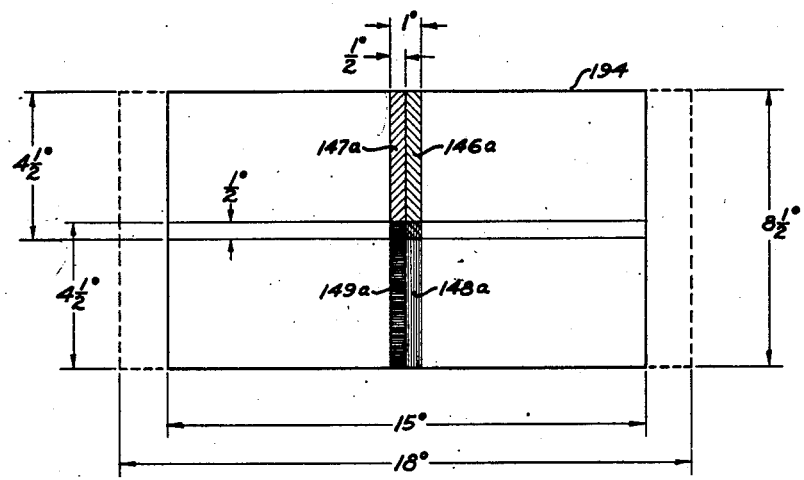
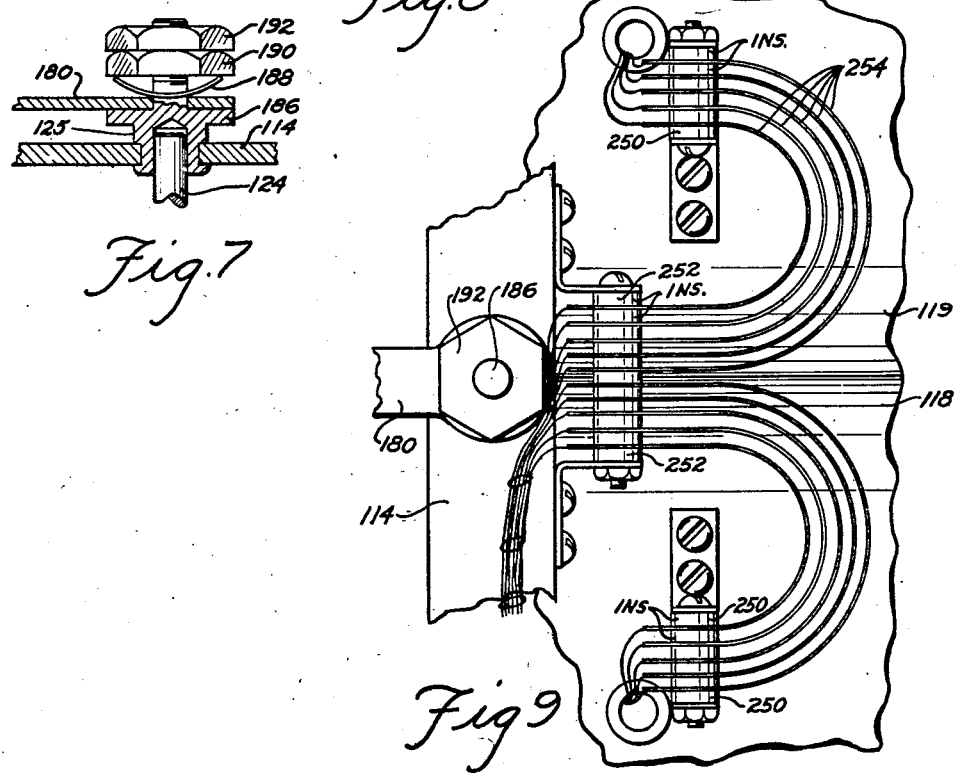
Inventor
Laurens Hammond
By Benjamin F. Hopper
Atty.

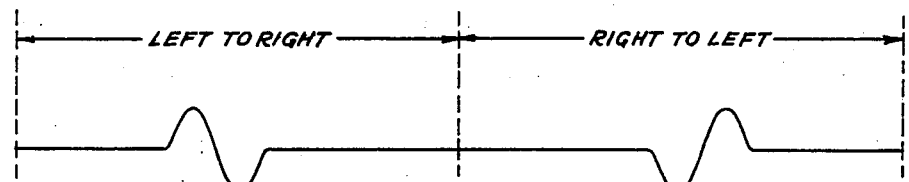
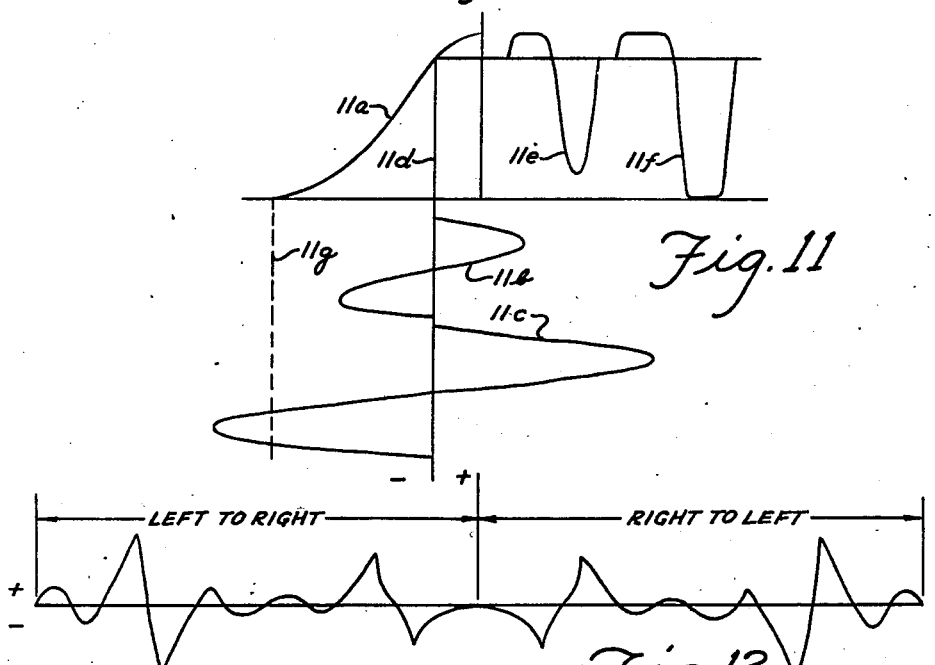
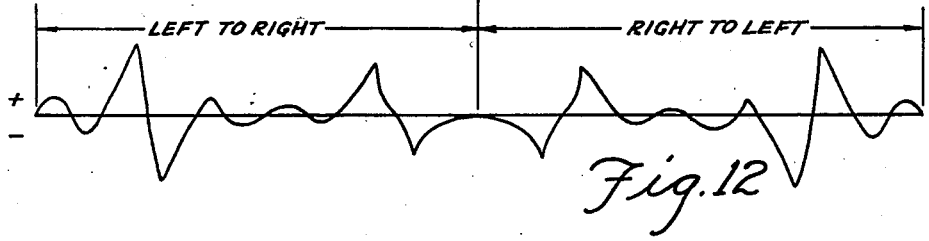
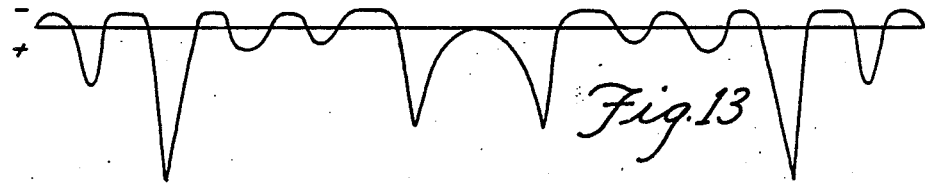
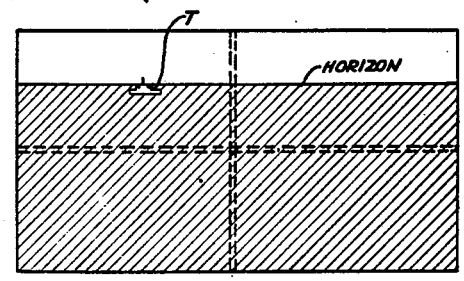

Inventor
Laurens Hammond
By Benjamin F. Wupper
Atty.

Jan. 7, 1947.  L. HAMMOND  2,413,870
RADIANT ENERGY DETECTING AND CONTROL APPARATUS
Filed Jan. 18, 1943   11 Sheets-Sheet 11
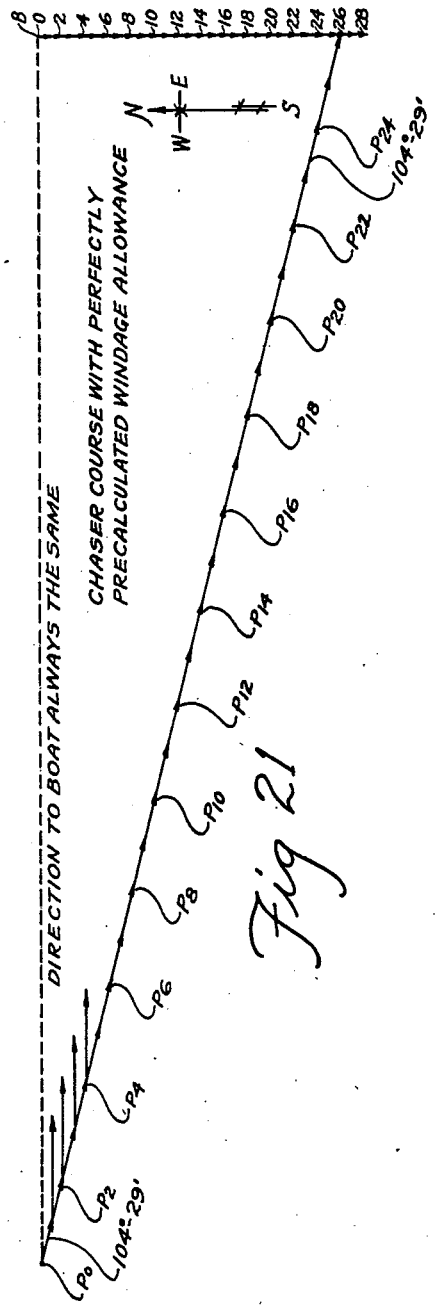
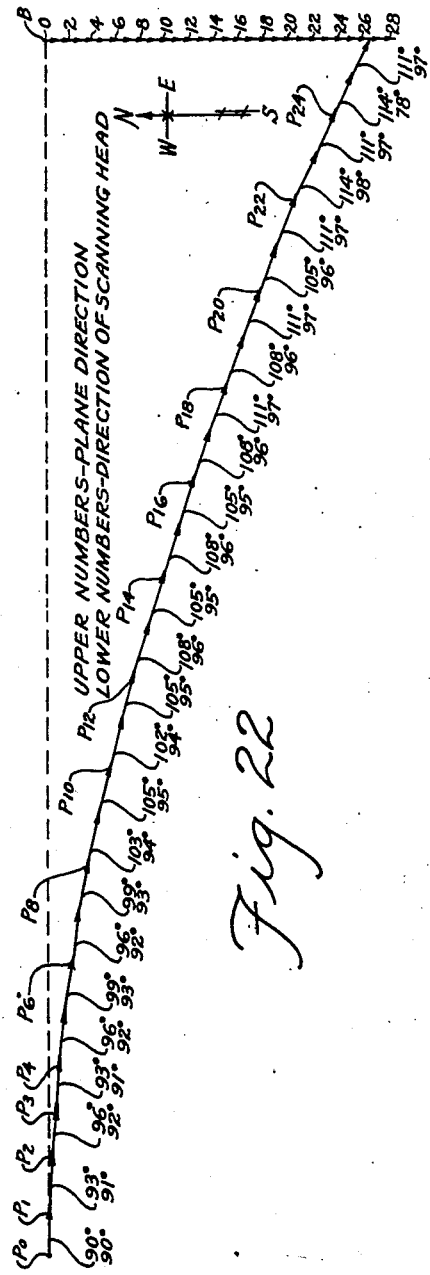
Inventor
Laurens Hammond
By Benjamin F. Wupper
Atty.

Patented Jan. 7, 1947

2,413,870

UNITED STATES PATENT OFFICE 2,413,870

RADIANT ENERGY DETECTING AND CONTROL APPARATUS

Laurens Hammond, Chicago, Ill.

Application January 18, 1943, Serial No. 472,735

19 Claims. (Cl. 250—41.5)

My invention relates generally to radiant energy controlled apparatus, and more particularly to improved scanning apparatus for detecting objects radiating or reflecting energy at an intensity differing from that of the surrounding field.

In many types of apparatus, particularly those used by the armed forces, it is desirable to be able to detect a source of radiation and to provide means for indicating the direction of the source. In addition, it is frequently desirable to steer a vehicle toward a selected radiation source (whether an original source or a source by reflection) such, for example, as steering a marine torpedo toward a hostile vessel. As disclosed herein, the invention is utilized for automatically steering an explosive carrying glider toward a target in response to light received from the target.

It is thus an object of the invention to provide an improved automatic target seeking apparatus.

A further object is to provide an improved photoelectric detection and amplifying system in which the sensitivity of the amplifying system decreases as the apparatus receives signals of increasing amplitude, for example, as the apparatus approaches a target.

A further object is to provide an improved radiation detection system in which means are provided for selecting a desired portion of a relatively large radiation source as providing the significant and controlling signal.

A further object is to provide an improved scanning apparatus which may be conditioned selectively to scan from right to left (R-L) or to scan from left to right (L-R), or to scan both R-L and L-R.

A further object is to provide an improved scanning system and apparatus controlled thereby to steer a vehicle toward a selected source of radiation within the field scanned.

A further object is to provide an improved system and apparatus for controlling the flight of a pilotless glider.

Other objects will appear from the following description, reference being had to the accompanying drawings in which:

Figures 1a, 1b, 1c, 1d and 1e together constitute a wiring diagram of the apparatus, the circuits of Fig. 1a forming part of the scanning head, the diagram of Figs. 1b and 1c constituting the amplifier, the diagram of Fig. 1d constituting the relay box, and the diagram of Fig. 1e constituting the automatic gyro-pilot control and the manual switch control box;

Figure 2 is a diagram indicating the manner in which Figs. 1a to 1e are to be joined to form a complete circuit diagram;

Figure 3 is a plan view, with portions shown in fragmentary section, of the scanning head;

Figure 4 is a side elevational view of the scanning head;

Figure 5 is a front elevational view of the scanning head with portions shown in section;

Figure 6 is a horizontal sectional view taken on the line 6—6 of Fig. 5;

Figure 7 is a fragmentary sectional view showing the portion of the frictional retarding mechanism;

Figure 8 is a diagram illustrating the shape and dimensions of the scanned field;

Figure 9 is a fragmentary plan view showing the resilient electrical connectors between the oscillating telescope tubes and the gimbal;

Fig. 10 is a diagram showing the wave form of the electrical signal produced when the apparatus scans a single discontinuity;

Figure 11 is a diagram illustrating the operation of the signal amplitude limiting electron discharge device;

Figure 12 is a diagram showing a representative wave constituting the input of the limiting electron discharge device;

Figure 13 is a diagram illustrating a representative wave form of the output of the limiting electron discharge device;

Figure 14 is a diagram illustrating the field of view of the apparatus which might be productive of the waves shown in Figs. 12 and 13 in which the target is remote from the apparatus;

Figure 21 is a diagram illustrating the path of movement of an airplane or glider following a chaser course with precalculated windage allowance; and, Figure 22 is a diagram illustrating the path of movement of an airplane or glider when its movement is controlled to follow a navigational course.

GENERAL DESCRIPTION

Figure 1D:
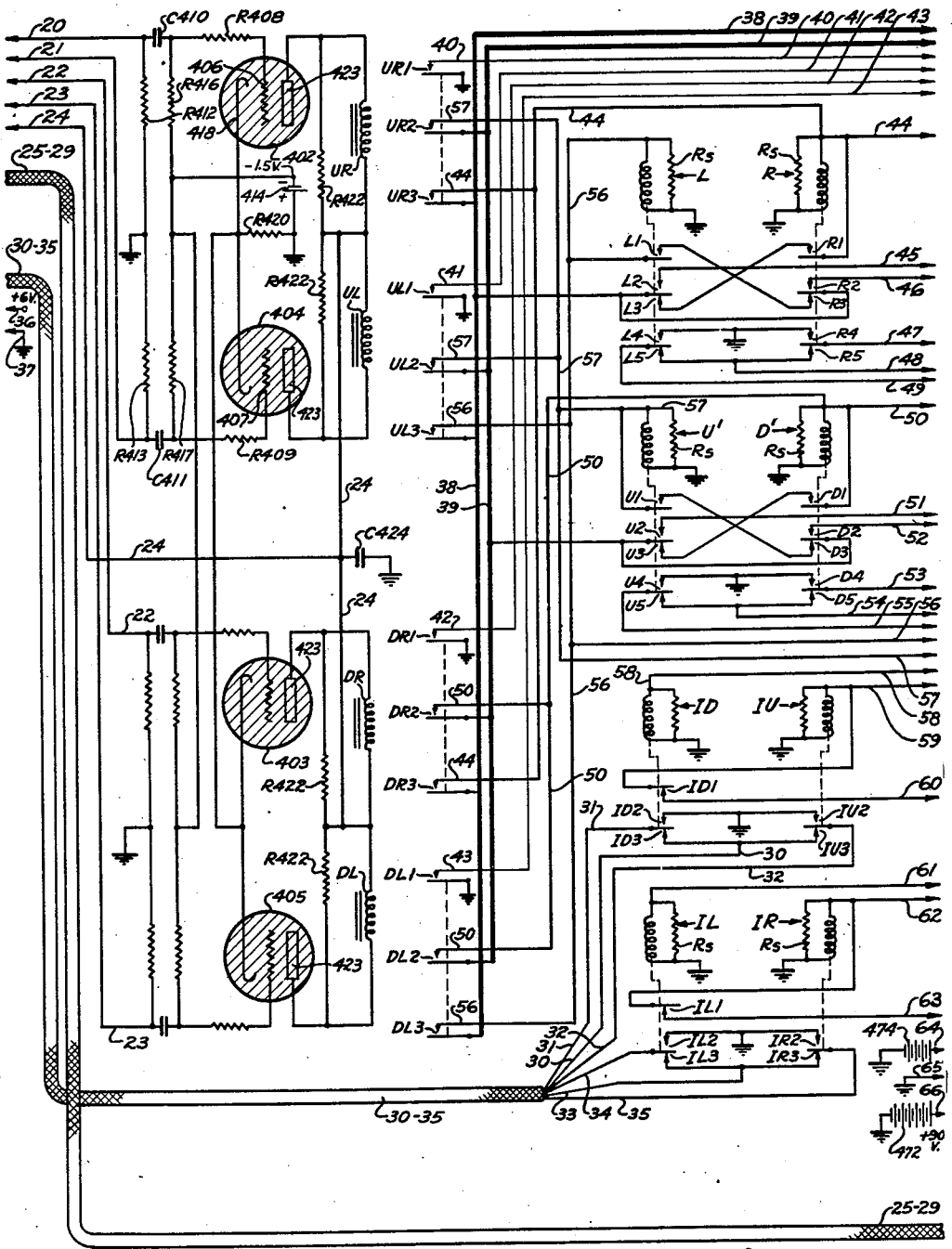

In order that the detailed description of the apparatus may be more readily understood, it is preceded by this brief general description of the apparatus as a whole.

As previously indicated, the invention is disclosed herein as embodied in an apparatus for automatically steering a pilotless glider to a source of radiation which differs in intensity or other characteristic from that of the field or objects surrounding it.

The apparatus may include, and is disclosed herein as including selectively operable controls whereby the glider (or other vehicle) will follow a "chaser course" or a "navigational course."

By "chaser course" is meant a course of travel wherein the target seeking vehicle is made to point and travel toward the target at every instant during its travel, within the limits of accuracy of the apparatus. With changes in direction of travel made at finite intervals and at finite rates, a chaser course does not result in the vehicle meeting the target with geometrical accuracy, but under many conditions a vehicle traveling on a chaser course toward a moving target will strike the target, especially if the latter is of reasonable size.

By a "navigational course" is meant a course of the vehicle which is, in effect, the result of computation based upon previous successive observations of the position of the target relative to the vehicle. By this method the vehicle is steered not directly toward the target, but instead is steered toward a point at which the target will be when the vehicle reaches the same point. In utilizing the navigational course method of steering the vehicle, the apparatus must repeatedly make "observations" of the position of the target and repeatedly modify its "prediction" of the location of the point at which the vehicle will strike the target, and must operate the steering controls of the vehicle accordingly.

In using the apparatus on a vehicle maneuverable in three dimensions, such as an airplane or glider, the "observations," the steering, and the "predictions" must of course be made not only with reference to the azimuthal directions, but also with reference to directions in a vertical plane.

The apparatus herein disclosed may be conditioned to operate on the chaser course or the navigational course principle in both azimuth and vertical plane, or it may be conditioned either to travel a chaser course in azimuth and a navigational course in the vertical plane or vice versa, depending upon the circumstances under which the apparatus is to be used.

The means for detection of the target comprises two pairs of radiation responsive devices shown as phototubes which, through an oscillating telescopic head, receive light from the field scanned. One pair of tubes receives light from adjacent rectangular areas, which rectangular areas, due to the oscillation of the head, laterally traverse a rectangular field, while the other pair of phototubes receives light from similar adjacent rectangular areas which traverse a rectangular field below that of the first rectangular field and preferably over-lapping it slightly.

The phototubes supply signals to an amplifying system. The amplifying system constitutes two cascaded amplifiers, one for each pair of phototubes. The amplifiers include novel automatic volume controls, each such control being common to corresponding stages of the two amplifiers, the arrangement being such that upon starting the apparatus all stages provide maximum gain, but that as the signals from the phototube increase in amplitude (as the glider approaches the target) the gain of the stages is progressively reduced so that signals of lesser amplitude than those due to the target will be suppressed.

These volume control stages comprise limiting means for preventing transmission through the amplifier of any but the highest intensity signal provided by the pairs of phototubes during each scanning cycle, so that it is only the signal representing the target that is transmitted through the amplifier, and thus signals of lower amplitude, resulting from variations in intensity of radiation from portions of the field other than the target, and which are of no significance, are not transmitted through the amplifiers.

The output signals of the amplifiers are switched in synchronism with the scanning oscillation of the head to four control circuits so that these circuits may provide, by their energization, an indication of the location of the target in the over-all field of view being scanned. For purposes of description hereinafter, the four quadrants of the generally rectangular field scanned by the apparatus will be designated: UR, upper right or first quadrant; UL, upper left, or second quadrant; DR, lower (down) right or fourth quadrant; and DL, lower (down) left or third quadrant.

Thus, significant signals from the amplifiers energize one or more of these control circuits which, through relays, control the operation of means for steering the glider. As shown herein, these means comprise motors operating upon the manual control button shafts of a well known automatic gyro-pilot.

Selective means are provided to determine whether a significant signal from the amplifier during R–L, or L–R, or both R–L and L–R strokes of the oscillatory head shall be effective to energize the control circuits. When the apparatus is set for a "chaser course" the control circuits are arranged to cause steering of the glider toward the target, that is, the glider is maintained pointed at the target, or is kept pointed a predetermined angle off the target to allow for windage. Assuming that the speed of the glider is very high with respect to the speed of the target, the glider will eventually strike the target. In the case of a glider to be used against vessels at sea, the glider will preferably be provided with a hydrostatic pressure-controlled detonator so that the explosion will not take place until after the glider has struck the side of the vessel and dropped into the water adjacent thereto, thus securing maximum effectiveness of the explosive against the hull of the vessel.

Various manual control circuits are provided for initially testing the apparatus as a whole, for aiding in picking out the target, and for predetermining the character of the operation of the apparatus.

THE SCANNING HEAD

The scanning head, as shown in Figs. 3 to 6, is mounted on a base 100 which is adapted to be rigidly secured to the glider or other vehicle. A U-shaped frame, comprising joined vertical channels 102, 104 and a horizontal channel 106, is mounted for limited rotational movement about a central pivot 108, the frame having a plurality of pedestal brackets 110 secured to the channel 106, these brackets having foot portions 112 resting upon the upper surface of the base 100.

A rectangular gimbal 114 has pivot studs 116 projecting horizontally into suitable bearings fixed near the upper ends of the channels 102 and 104. A pair of telescope tubes 118 and 119 are secured to each other by plates 120, 121 which may be welded or otherwise secured to the tubes 118, 119. A central pivot shaft 124 is rigidly secured to the plates 120, 121, and is mounted in bearing bushings 125 and 127 fixed in the gimbal 114, the arrangement being such that the telescope tubes 118 and 119 are supported by the shaft 124, and thus may oscillate with respect to the gimbal 114.

*Optical system*

Each of the tubes 118, 119 contains a condensing lens system illustrated as comprising a pair of lenses 126. A light shade 128 is secured over the ends of the tubes 118, 119 and contains a plurality of peripherally flanged baffle supports 130 having progressively decreasing circular openings therein, the flanges of these baffle supports forming accurate positioning spacers.

Light baffles 132, which may be of thin dull black paper or other similar suitable material, are cemented to the baffle supports 130 and have circular openings of progressively decreasing diameter formed therein, these openings being co-axial with the optical axes of the lens systems, and each of slightly less diameter than the openings in the supports to which they are attached. The baffle supports 130 are finished in dull black so as to minimize the possibility of a reflection of light therefrom into the lens system.

A light slit member 134 is secured within each of the tubes 118, 119 at a point adjacent the focus of the lens system, this member having an elongated vertical slit 136 formed therein. Directly behind the slit 136 of each of the telescopes is a reflecting prism 138, extending at least the full length of the slit, and mounted on vertical pivots 139. Each of the pivots 139 extends through the top of the telescope tube and has an arm 140 rigidly secured thereto. The arm 140 is held against the end of an adjusting screw 142 by a strong tension spring 144. It will be apparent that by turning the adjusting screw 142 the prism 138 may be rotated about the axis of its pivots 139 so as to have its edge accurately centered behind the slit 136.

The prisms 138 are preferably made of metal, such as steel, plated with a metal providing good reflecting surface, such as chromium.

Light reflected from the surfaces of the prism 138 in the tube 119 enters phototubes 146, 147, while light entering the telescope tube 118 is reflected by its prism to phototubes 148 and 149 (Fig. 1a). A shielding box 150 is mounted within each of the tubes 118, 119 and contains a preamplifier later to be described.

*Telescope oscillating mechanism*

As best shown in bottom plan section in Fig. 6, a pair of solenoid coils 152, 153 are rigidly secured to the gimbal 114 by being clamped in a pair of bolted bracket members 154 which are rigidly secured to the gimbal 114. A bracket 156 is also rigidly secured to the gimbal 114 and has a downwardly extending lug 159 to which one end of the heavy leaf spring 160 is riveted. The outer end of the leaf spring 160 is secured to the end of a second relatively short leaf spring 162 by means of an angle 164 riveted to the springs. The other end of the leaf spring 162 is secured to a bracket 166 which is riveted to the plate 120.

The leaf spring 160 is best shown in Fig. 6 in its normal unstressed position, and will thus be capable of applying a force tending to return the telescope tubes to this center position whenever the tubes are displaced from this position. The oscillation is effected by alternate energization of the coils 152, 153 which operate on solenoid plungers 168 and 169 respectively, these plungers being partly of magnetic and partly non-magnetic material and each having one end pivotally secured respectively to studs 170 riveted to the plate 120. The other ends of the plungers 168, 169 are pivotally secured to the ends of a lever 172 which is mounted for pivotal movement about a central pivot 174 carried by the gimbal 114.

The plungers 168, 169 and the lever 172 and plate 120 thus form a parallelogram linkage with the result that the plungers 168 will retain parallelism throughout their movement. In order to oscillate the telescopes 118, 119 the coils 152, 153 are alternately energized by means hereinafter to be described. These solenoids operate against the resiliency of the spring 160, and as will hereinafter appear, are energized alternately, each throughout substantially the complete stroke of the telescope tubes in one direction, and the spring 160 supplies the force to cause commencement of the stroke in the opposite direction.

A stud 176 is riveted to the plate 121 and thus oscillates with the telescope tubes. The upper end of this stud 176 has flats formed thereon and projects through an arcuate slot 178 formed in the end of an arm 180. The effective ends of the slot 178 are determined by adjustable buffers 182 of felt, or similar material, which are secured in adjusted position by bolts 184. The arm 180 is pivotally mounted on the bushing 125 (Fig. 7) and rests upon a shoulder 186 formed on this bushing. A relatively stiff spring washer 188 presses the arm 180 against the shoulder 186, the degree of pressure being determined by adjustment of a nut 190 held in adjusted position by a lock nut 192. Thus, as the oscillating head approaches the ends of its oscillatory stroke, the stud 176 abuts against one of the stops 182 and the motion of the head is quickly retarded to a stop by virtue of the friction between the arm 180 and the shoulder 186.

It will be noted (Fig. 5) that the telescope tube 119 is not exactly parallel to the tube 118. The optical axis of the tube 119 is elevated with respect to the optical axis of the tube 118. This elevation, in the embodiment illustrated, is 4°. As a result, the phototubes are capable of scanning a field diagrammatically shown in Fig. 8. Referring to this figure, when the oscillating head is in central position, the phototube 146 will receive light from the area 146a, and the phototubes 147, 148 and 149 will receive light from the areas designated respectively 147a, 148a and 149a. The angular dimensions of each of these areas are 4½° in the vertical direction and ½° in the horizontal direction. The head oscillates through a total angle of 18° represented by the dotted line rectangle in Fig. 8, but because of mechanism later to be described, the signals from the phototubes received during the first 1½° of each oscillation are not effectively utilized, and the total field effectively scanned is therefore represented by the large full line rectangle 194 which has angular dimensions of 8½° by 15°. It will be noted that the areas 146a and 147a respectively over-lap the areas 148a and 149a by ½°. The rotary moment of inertia of the telescope tube assembly is of such value relative to the resiliency of the spring 160 and the pull of the solenoids, and relative to the friction applied by the arm 180, that the oscillation of this assembly is smooth and at a uniform speed, in the order of 2 cycles per second.

Stops, such as rubber covered pins 193, 195 (Figs. 3 and 5) adapted to engage the gimbal 114, may be provided to limit the extent of oscillatory movement of the telescope tubes.

Head indexing mechanism

In some uses of the apparatus, it is desirable to provide means for changing the elevation of the scanning head relative to the base 100, either as an initial adjustment, or as steps in following a navigational course. This is accomplished by means of a reversible electric motor 196 suitably secured in the vertical channel 104 and including a reduction gearing terminating in a pinion 198. This pinion meshes with a gear segment 200 rigidly secured to the gimbal pivot pin 116. The driving action of the pinion is limited by recesses 201 formed in the segment 200. The motor 196 may be manually or automatically controlled, as will hereinafter appear, and thus will operate to swing the gimbal 114 and all parts carried thereby for the purpose of changing the elevation of the telescope tubes 118, 119.

In some uses of the apparatus it may be convenient to have available remotely controlled means to adjust the orientation of the frame with respect to the base 100, and hence with respect to the vehicle upon which the apparatus is mounted. Such adjustment is essential when the apparatus is used to cause the vehicle to follow a navigational course as herein described. For this purpose a motor controlled means is provided to rotate the frame 102, 104 and 106 about the pivot pin 108. This means comprises a motor and reducing gear train 202 having a slow speed drive shaft 204. A bevel pinion 206, secured to the shaft 204, drives a bevel gear 208 secured to a shaft 210. The shaft 210 is mounted in a suitable bearing bushing 212 secured in the channel 105, and has a pinion 214 secured to its lower end. The pinion 214 meshes with a ring gear 216 secured to the base 100.

An arcuate contact segment 218 is mounted in the base 100 and insulated therefrom. A switch arm 220 secured to the horizontal frame channel 106, but insulated therefrom, is capable of wiping over the contact segment 218 and make contact therewith when the frame is shifted from its normal central position to the right with respect to the base 100. The motor 202 is a reversible motor and is controlled by means hereinafter to be described.

Head operated switches

Switches I and S respectively comprise switch arms 222, 223 (Fig. 6) which are frictionally secured to the gimbal 114 but insulated therefrom. The switch arm 222 carries a contact element 224 which moves relatively between contacts 226 and 228 which are secured to but insulated from the plate 120. Similarly, the switch arm 223 has a contact 225 which may move relatively between a pair of contacts 227 and 229, the contacts 227 and 229 being mechanically secured to but insulated from the plate 120.

Each of the contacts 226 to 229 has one end of a thin flexible resilient metal band 230 connected thereto, the other ends of these bands being anchored in an insulating terminal block 232 which is suitably secured to the gimbal 114. It will be noted that the flexible bands 230 are formed symmetrically in bights so that the resilient forces exerted thereby between the oscillating telescopes and the gimbal 114 are balanced. The bands are spaced sufficiently in a vertical plane so as not to make contact with one another. At their ends adjacent the terminal block 232 the bands 230 are formed with soldering lugs for attachment with suitable conductors, which are combined to form a flexible cable 233. The switch arms 222, 223 are likewise connected by bands 230 leading to the terminal block 232. In general, the mounting of the switch arms 222, 223 may be similar to that shown in the patent to David Hancock, Jr., No. 2,301,870.

It will be seen that as the telescope tubes 18, 19 swing in one direction relative to the gimbal 114, contact 228 will engage contact 224, and contact 229 will engage contact 225. At the beginning of the reverse stroke of the telescope tubes, the aforementioned contacts will be broken, and shortly thereafter (about 1½° of movement) the contact 226 will engage contact 224, and contact 227 will engage contact 225. These contacts will remain closed throughout the return stroke and will be broken only upon the commencement of another forward stroke.

A switch A comprises an arm 234 (Figs. 3 and 4) which is secured to the gimbal 114 but suitably insulated therefrom, and has a contact point engageable with a conducting plate 236 embedded flush in an insulating block 238 which is rigidly secured to the frame channel 104. Thus, when the telescope tubes are elevated slightly above their normal positions (swung clockwise, Fig. 4), the switch arm 234 will make contact with the plate 236, and this contact will be broken whenever the telescope tubes are depressed (swung counterclockwise, Fig. 4) slightly below their normal horizontal position.

A switch D comprises flexible switch arm 240 which has one end suitably secured to an insulating terminal block 242 attached to the top of the gimbal 114. Also secured to this terminal block is a switch contact 244 adapted to be engaged by the switch arm 240.

A switch contact member 246 is rigidly secured to the plate 121 but insulated therefrom and is adapted to engage the free end of the switch arm 240. Suitable contact points are secured to the switch arm 240 or to the switch parts 244 and 246, or both.

As the telescopes oscillate in a counterclockwise direction from their central position shown in Fig. 3, the end of the switch member 246 engages the end of the switch arm 240, completing a circuit between these switch parts and immediately thereafter (practically instantaneously therewith) breaking the contact between the switch arm 240 and the switch contact 244. Upon return of the telescopes to their central position, the switch arm 240 again makes contact with the switch contact 244, while immediately thereafter (substantially instantaneously therewith) the contact between switch member 246 and the switch arm 240 is broken, since further flexure of the switch arm 240 is prevented by its engagement with the rigidly mounted switch contact 244. This switch mechanism including the parts 240 to 246 is designated generally by the letter D. A switch U (Fig. 3), of construction identical with that of switch D, is mounted on the gimbal 114 directly beneath switch D, and operates in the same manner as switch D.

A switch K (Fig. 5) constructed and operating exactly like switches D and U is mounted on the gimbal 114 above the telescope tube 119.

As best shown in Figs. 3 and 9, there is suitably secured to each of the telescope tubes 118, 119, an insulating block 250, and there is secured to the gimbal 114 a long insulating block 252. A plurality of thin resilient strips 254 of phosphor bronze or similar material are formed in semicircular bights of successively smaller radius, and each of these strips has one end anchored to one of the insulating blocks 250 and its other end anchored to the insulating block 252. The ends of these strips 254 project through the insulating blocks and form soldering lugs for attachment of wires leading from the phototubes and preamplifier to the amplifier.

It will be noted that as the telescope tubes oscillate (approximately 9° to the right and 9° to the left of the central position shown), the strips 254 will flex, but substantially maintain their relative separation. One group of strips opposes the other group of strips so that they exert the least force when the telescope tubes are in central position, and the resiliency of these strips thus supplements the resiliency of the spring 160. Since these strips 254 may flex freely and are not in contact with one another, and since they are firmly anchored at their ends, they do not introduce any appreciable frictional forces nor absorb power from the telescope oscillating motor means. This type of flexible connection is therefore far superior to any flexible pigtail or cable through which the circuits to the phototubes and preamplifier might otherwise be completed.

THE AMPLIFYING SYSTEM

Figure 1E:
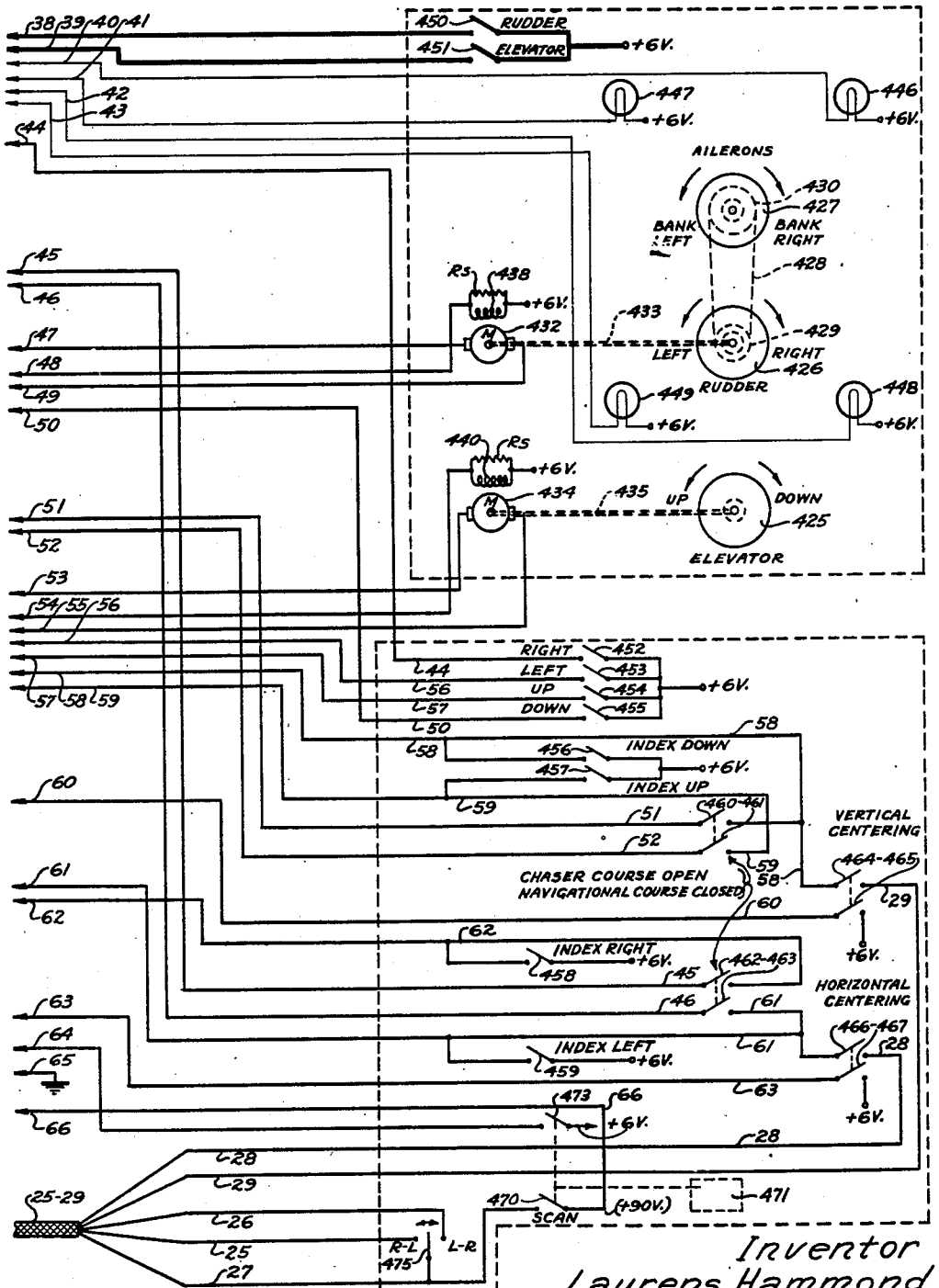

By reference to Fig. 2, the relationship of Figs. 1a, 1b, 1c, 1d and 1e will be apparent. The circuits of Fig. 1b are connected to the circuits of Fig. 1a by conductors 10 to 17 inclusive, while the circuits of Fig. 1d are connected to the circuits of Fig. 1a by conductors 20 to 37 inclusive. The circuits of Fig. 1e are connected to the circuits of Fig. 1d by conductors 25 to 29 inclusive and 38 to 66 inclusive.

The amplifying system (except for the first stage of preamplification) is shown in Figs. 1b and 1c, and the apparatus shown in these two figures is preferably contained in a separate shielded box. Similarly, all of the parts shown in Fig. 1d may be mounted in a separate box, while the parts shown in Fig. 1e may be contained in part in a box attached to the gyro-pilot control panel, and in part in a separate control switch box.

Referring to Figs. 1a and 1b, the conductor 10 is connected to a +90 v. terminal of a battery 256 through a filter resistor R257. The conductor 10 is shunted to ground through a condenser C255 and thus supplies a 90 volt potential to the anodes of phototubes 146 and 148. The cathode of phototube 146 is connected by a conductor 258 to the anode of phototube 147, while the cathode of phototube 147 is connected to ground. Similarly, the cathode of phototube 148 is connected by a conductor 259 to the anode of phototube 149, while the cathode of the latter is connected to ground.

The conductor 258 is connected through a condenser C260 and spurious high frequency filtering series grid resistor R262 to the grid 264 of a preamplifier pentode 266. The condenser C260 is also connected through a grid resistor R268 to ground. In a similar manner a condenser C261 is coupled to the grid 265 of a pentode preamplifier tube 267. The screen and suppressor grids of the tubes 266 and 267 are connected with their plates 270 and 271 respectively to conductors 11 and 15 respectively, so that these tubes will operate as triodes and provide Class A amplification. The cathodes 272 and 273 of these tubes are connected respectively to conductors 13 and 14. Conductor 13 is connected to ground through a self bias resistor R274 and a jack switch 276, while the conductor 14 is similarly connected to ground through resistor R275 and a jack switch 277. Upon insertion of plugs in these jacks, these switches 276 and 277 are opened.

The jacks 278 and 279 are provided for plugging in a milliammeter for adjustment and checking purposes. For example, in order properly to adjust the reflecting prisms 138, 139, using such milliammeter, the adjusting procedure would be as follows: The optical system would be pointed toward a field of uniform illumination and the sight openings of the telescope tubes completely obscured by a black sheet. The meter reading would then be noted and the sheet would then be quickly raised vertically and the meter reading again noted. If during the time that the sheet is being raised the meter needle fluctuates in either direction, it indicates that the prism is not properly centered and correcting adjustment may then be made. A meter inserted in these jacks may also be used for testing purposes to indicate that the proper plate current is flowing in the tubes 266, 267.

In general, as the telescope and phototubes oscillate and "view" an object radiating more light than the surrounding uniform field, the phototube 146 will first supply a positive signal to the grid 264, and immediately thereafter as the tube 147 receives light from such object, the grid 264 will receive a negative impulse. Upon the return oscillation of the scanning head, the phototube 147 will transmit a negative impulse to the grid 264, and immediately thereafter the phototube 146 will provide a positive impulse on the grid 264. The impulses supplied to the grid under these assumed ideal conditions are represented by the wave shown in Fig. 10. The output of the first preamplifier tube would be a similar amplified wave of opposite phase.

Plate current for the preamplifier tube 266 is provided through a resistor R282 connected between the +90 v. terminal and the conductor 11, and in a similar manner plate current is supplied for the tube 267 through a resistor R283. The preamplifier tube 266 is coupled to a second stage of preamplification, comprising a pentode 284, through a blocking condenser C286, a high pass filtering mesh comprising condensers C290 and C294, and resistors R288, R292 and R300, and through a spurious high frequency filtering series grid resistor R296.

The grid 298 of the tube 284 is biased through the grid resistor R300 which is connected to a terminal −1.5 v. of a biasing battery 302, the positive terminal of which is connected to ground. The cathode 304 of the pentode 284 is connected to ground, while its screen and suppressor grids are connected to its plate 306, plate current being supplied from a +90 v. terminal through a load resistor R308. The pentode 284 thus operates as a triode providing Class A amplification.

The output of the pentode 284 is coupled to the input circuit of a signal amplitude limiting pentode 310 through a blocking condenser C312, and a voltage divider comprising resistors R314 and R316. The junction 318 of resistors R314 and R316 is connected through a series grid resistor R320 to the grid 322 of the pentode 310. The other terminal of the resistor R316 is connected to a −1.5 v. terminal.

The suppressor grid of the pentode 310 (which may be of the 6W7G type) is externally connected to the grounded cathode 324, while the screen grid 326 is connected to a +45 v. terminal of battery 256. Plate current is supplied through a load resistor R328 from a +90 v. terminal.

The pentode 310 operates in a manner to reduce the amplification of the low value positive peaks of the wave, and to increase amplification of the negative half of the wave as diagrammatically illustrated in Fig. 11. In this figure the curve 11a represents the grid voltage-plate current characteristic, for negative grid potentials, of a 6W7G pentode connected as is the tube 310 shown in Fig. 1b.

Two input waves 11b and 11c are indicated on the grid voltage axis 11d. The resultant output waves of the tube are illustrated as 11e and 11f respectively. From this diagram it will be noted that when the amplitude of the input wave, such as 11b, (representing the signal due to a distant target) is not very great, the tube operates substantially to cut off the positive peaks of the input wave to the grid and to amplify linearly the negative peaks. The positive portions of the output wave 11e are reduced in amplitude due to the effect of the series grid resistor R296. When the grid potential is positive with respect to the cathode, the grid input impedance falls to a finite value, small relative to the value of R296, with the result that there is a voltage divider action, causing the signal on the grid to be greatly reduced. When the input wave on the grid is of much greater amplitude, such as shown by the wave 11c, (representing the signal due to a close target) the tube operates not only to cut off the positive portion of this input wave but also limits the output amplitude due to the negative portion of the input wave.

Briefly, the operation of the non-linear pentode 310 is as follows: Below a critical threshold amplitude of input signal the tube operates in such manner as to differentiate between negative swings of different amplitudes. Above this critical threshold point the tube is unable to distinguish between negative pulses because every such large amplitude pulse drives the tube to plate current cutoff represented by the line 11g. The particular purpose of this type of operation of the tube will appear from the description of the operation of the system as a whole.

The output of the pentode 310 is connected to the input of an automatic volume control triode 330 through a blocking condenser C332 which also forms part of a high pass filter mesh including resistors R334 and R336. A grid condenser C338 is connected between the junction of resistors R334, R336 and the grid 340. The grid 340 is connected to a −1.5 v. bias terminal through a resistor R342 of a value in the order of 3 megohms and a resistor R344 of high value in the order of 50 megohms.

When the signal to this grid is large, by comparison with the negative grid bias, grid rectification takes place with the resultant automatic biasing of this grid to a negative potential higher than the normal grid bias.

The grid condenser C338 may have a value in the order of .1 mfd. with the result that it will take an appreciable time interval after a decidedly positive impulse upon the grid 340 before the grid returns to its normal value bias of −1.5 v.

Assuming that the head oscillates at 2 cps, the values of the condenser C338 and resistors R342 and R344 are such that it will take more than .5 second (and in actual practice may be in the order of 5 to 10 seconds) for the grid to return to substantially its normal −1.5 v. potential after a substantial amplitude positive signal has been impressed thereon. The result is that as a close succession of positive impulses is impressed upon the grid 340, appreciable changes in plate current will take place only upon the highest amplitude positive impulse.

The plate 346 of the triode 330 is supplied with plate current through a load resistor R348 connected to a +90 v. terminal, and the signal component of the plate current is transmitted through a blocking condenser C350, through a voltage divider network comprising resistors R352 and R354, and a grid resistor R356 to the control grid 358 of a phase inverting triode 360. The cathode 362 of this tube is connected to ground through a biasing resistor R364. Plate current for the triode 360 is supplied through a load resistor R366.

The triodes 330 and 360 and associated circuit elements comprise a single stage of amplifying and volume control. The output of the phase inverter triode 360 is transmitted through a band pass filter mesh 370 to the input of an automatic volume control triode 376, and the output of the latter is transmitted through a high pass filter and voltage dividing mesh 380 to a phase inverting triode 382.

The output of the triode 382 is coupled to the input of an automatic volume control triode 386 through a band pass filtering mesh 390. The output of the triode 386 is coupled with a voltage divider and high pass filtering mesh 392 to the input of a phase inverting triode 396.

The output of the phase inverting triode 396 is transmitted through a blocking condenser C398 to a conductor 16. Triodes 376 and 382, and the circuit elements associated therewith, are in substance identical with triodes 330 and 360 and the circuit elements associated therewith, and thus form a second cascaded stage of amplification and automatic volume control. Triodes 386 and 396 and the circuit elements associated therewith are likewise similar to the triodes 330 and 360 and their associated circuit elements, and thus constitute the third and final cascaded stage of amplification and automatic volume control.

The output of the preamplifier tube 267 (Fig. 1a) is coupled through conductor 15 to the input of the second stage preamplifier pentode 285 which, with its associated circuit elements, corresponds to the pentode 284 above described. Likewise, tube 311 corresponds to tube 310 and is coupled to tube 285 in the same manner that tube 310 is coupled to tube 284. In a similar way, the triodes 331, 361, 377, 383, 387 and 397, together with their associated circuit elements, correspond respectively to triodes 330, 360, 376, 382, 386 and 396 and their associated elements respectively. The output of the triode 397 is transmitted through a blocking condenser C399 to a conductor 17, the conductors 16 and 17 being respectively connected to ground through resistors R400 and R401.

While the above described amplifier elements having reference characters which are even numbers may be identical with the corresponding parts of the amplifier whose elements bear reference characters which are odd numbers, it will be noted that the bias voltage for tubes 330 and 331 is supplied through a common resistor R344 and individual relatively low value resistors R342 and R343 respectively. As a result, the grid bias on the triodes 330 and 331 will be substantially the same at all times. From this it will be apparent that as one of the amplifier triodes is made less sensitive by having impressed thereon a high amplitude signal, the sensitivity of the other triode is correspondingly reduced. In the same way automatic gain control triodes 376 and 377 are supplied with biasing voltage through a common resistor R374 of high value (in the order of 50 megohms) which has one terminal connected to a —1.5 v. terminal, while the grids of triodes 376 and 377 are connected to the other terminal of the resistor R374 through relatively low value (in the order of 3 megohms) resistors R372 and R373. Thus, these corresponding stages of the two amplifiers are likewise retained at substantially equal sensitivity. Similarly, the grid bias for triodes 386 and 387 is supplied through a common resistor R384 which has one terminal connected to a —1.5 v. terminal, and has its other terminal connected to the grids of the tubes 386 and 387 through relatively lower value resistors R382 and R383 respectively, and these corresponding stages are likewise maintained at equal sensitivity.

*Operation of the amplifying system*

Figure 15:
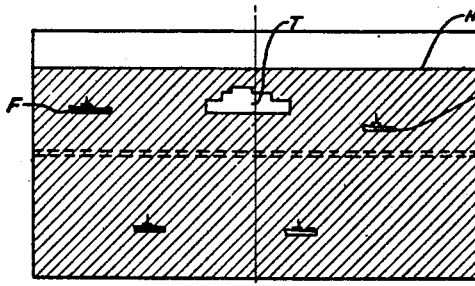
Figure 15 is a diagram illustrating the field of view of the apparatus as it approaches more closely to the target.

Let us assume that the apparatus is scanning a field illustrated in Fig. 14 in which appears a boat T which is lighter than the background, i. e., its radiation of light of a frequency to which the phototubes respond is more than that of the remainder of the field. At the initial great distance between the boat and the apparatus, large whitecaps and other discolorations of the water, small floating objects, etc., provide such minor variations in radiation that they are very small compared to the change in intensity of radiation as the phototubes 146, 147 scan the boat in the upper half portion of the field. The signal produced by the phototubes 146, 147 will therefore be somewhat similar to the wave shape illustrated in Fig. 12 as the head traverses a complete cycle. This signal from the phototubes 146, 147 will be faithfully transmitted through the preamplifier pentodes 266 and 284 and will be impressed upon the grid of the limiter tube 310 which, due mainly to the series grid resistor R320, responds only to the relatively high amplitude negative peaks of the received signal and will thus have an output, as previously mentioned, similar to the wave of Fig. 13. Through means, hereinafter to be described, the apparatus will be steered toward the target so that at some time later the target may appear in the field of view of the apparatus as indicated in Fig. 15. At this close range the apparatus would also be sensitive to variations in radiation resulting from other objects such as white caps, clouds, etc., or other small floating objects indicated generally as F.

The amplifier, however, operates in such manner that signals from the phototubes, due to such objects as F, are ignored. This is accomplished because of the fact that the triode 386, due to the regular reception of high amplitude signals, is biased so far negatively that only the highest amplitude positive peak signal will be transmitted by this tube. Since the signal is amplified to the greatest extent in this last stage represented by the triode 386, this will be the first automatic volume control triode to be rendered insensitive to any but the highest amplitude positive peaks of the input signal. As the apparatus approaches closely to the boat T, the amplitudes of the signals impressed upon the triode 376 will be such as to increase negatively the bias on this triode to make it transmit only the highest positive peak of its input signals. Similarly, as the apparatus arrives still closer to the boat T, the input signal on the triode 330 becomes of such high amplitude that this triode is also biased negatively to such an extent that it is, in effect, cut off except for the highest amplitude positive signal of its input. Thus, for example, as the apparatus approaches so closely that the boat T appears in the proportion indicated in Fig. 15 the signals from the phototubes, due to variations in intensity as a result of scanning the objects F, are not of sufficiently high amplitude to be transmitted by either the triodes 386, 376 or 330, since the grids of these triodes are at plate current cutoff for signals of these amplitudes.

Figure 17:
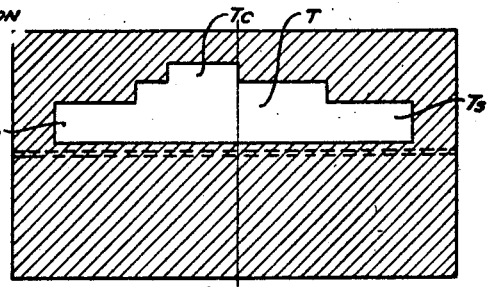
Figure 17 is a diagram illustrating the field of view of the apparatus as it approaches very close to the target.
Figure 16:
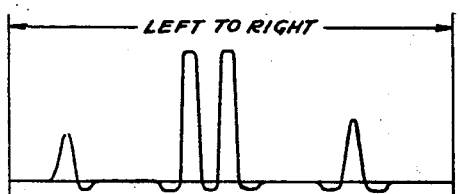
Figure 16 is a diagram showing the wave form of the output of the upper amplifier when the apparatus is scanning the field represented in Fig. 15.
Figure 18:
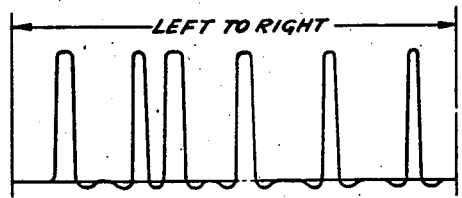
Figure 18 is a diagram showing the wave form of the output of the upper amplifier while scanning the field of view illustrated in Fig. 17.

However, as the boat T appears larger in the field of view of the apparatus, as shown in Fig. 17, the differences in radiation from the various portions of the boat would, if means were not provided to prevent it, have a significant effect. For example, as the phototubes 146, 147 scan the superstructure (or cabin) Tc of the boat T they produce the maximum signal, whereas it is desired to control the direction of travel of the apparatus not to the point from which the radiation is greatest, but from a selected point such as the bow Tb of the boat. The amplifying system will transmit substantially equivalent signals as the phototubes 146, 147 scan the bow Tb, cabin Tc and stern Ts, as shown in Fig. 18. Other elements of the control apparatus, hereinafter to be described, are designed to accept for control purposes only the first of such series of signals received during selected scanning strokes (i. e. L-R or R-L, or both L-R and R-L).

Because of the use of the limiter tube and the successive stages of automatic volume control whereby the sensitivity of the amplifier as a whole decreases successively as the amplitude of the maximum signal received increases, the amplifier is capable of supplying a series of significant signals which, by other means, may be selectively utilized to provide indications of the positions of the bow Tb and the stern Ts. The vehicle steering apparatus, as will hereinafter appear, will tend always to point the apparatus in a direction such that the boat or other target will appear at the center of the field scanned.

The phototubes 148 and 149 scan the lower quadrants of the rectangular field of view of the apparatus in the same manner as the phototubes 146, 147 scan the upper quadrants, and the foregoing description of the operation of the amplifying system for the upper quadrants will apply equally to the amplifier for the signals from the lower quadrants.

Due to the common bias voltage supply for the corresponding automatic volume control triodes of the successive stages of the two amplifiers, the degree of sensitivity of the two amplifiers is kept approximately the same. Thus, it is the highest amplitude signal received from an object in any one of the four quadrants which will be transmitted by its associated amplifier, and which will prevent either of the amplifiers from transmitting any signals of lesser intensity.

If, for example, the apparatus has its field of view violently shifted as by an air pocket or a gust of wind so that the boat T appears in the lower half of the field, the false target objects F will, nevertheless, not be capable of producing a significant output signal from the amplifiers because due to the common bias source for the corresponding automatic volume control triodes of the two amplifiers, the two amplifiers will at each instant be operating with the same gain, and be incapable of transmitting any but the highest amplitude signal.

The foregoing description of the operation of the amplifier can be summarized in a general way as follows: When the apparatus is a great distance from the target and the signal is correspondingly very small, the entire operation of the amplifier is linear, therefore the highest signal produced will be the significant signal. As the apparatus approaches closer to the target the automatic volume control tubes start to function, and the highest signal is still the significant signal. When the apparatus has approached so closely to the target that all portions of the target cause the limiter tube to be completely overdriven, the significant signal now becomes the first one received during any cycle of scanning.

For reference purposes the amplifier as shown at the top of Figs. 1a, 1b and 1c, and which responds to signals received from the upper half of the whole field scanned, will be referred to as the "up" amplifier and as providing an "up" signal. The amplifying system shown beneath the upper amplifier and which responds to signals from the phototubes 148, 149 will be referred to as the "down" amplifier. When the target produces a signal in the up amplifier it generally means that the direction of travel of the vehicle must change in an upward direction, while when the target appears in the lower half of the scanned field and produces a signal in the phototubes 148 and 149 and is transmitted through the down amplifier, it usually means that the vehicle must change its course downwardly in order to keep directed toward the target.

*The control circuits*

As shown in Fig. 1d, there are four Thyratrons or gaseous triodes 402 and 404, 403 and 405, preferably of the 884 type. The control grid 406 of the tube 402 is connected through a protective resistor R408 and a blocking condenser C410 to the conductor 20. In a similar way the grid 407 of the tube 404 is connected through a protective resistor R409 and blocking condenser C411 to the conductor 21. Conductors 20 and 21 are respectively connected to ground through shunt resistors R412 and R413, while the grids 406 and 407 are respectively connected to a −1.5 v. terminal of a biasing battery 414 through grid resistors R416 and R417.

The cathodes 418 of the four tubes 402 to 405 are connected to ground through a common bias resistor R420. Plate current for the operation of the tubes 402 to 405 is supplied through the conductor 24 (through a circuit hereinafter to be described), the conductor 24 being connected through ignition maintaining protective resistors R422 to the plates 423 respectively of each of these tubes. Plate current of tube 402 may also flow through a relay winding UR (up-right) which is connected between the plate and the conductor 24. Similarly, a relay winding UL (up-left) is connected in the plate circuit of the tube 404. A relay winding DR (down-right) is connected in the plate circuit of tube 403, and a relay winding DL (down-left) is connected in the plate circuit of tube 405.

The relay UR when energized is adapted to close switches UR1, UR2 and UR3, and similarly, relay UL when energized closes switches UL1, UL2 and UL3. The relay DR when energized closes switches DR1, DR2 and DR3, and relay DL when energized closes switches DL1, DL2 and DL3. A condenser C424 is connected between the conductor 24 and ground and reduces arcing at switch contacts associated with conductor 24, and stores energy to be supplied when plate current commences flowing in any one of these tubes.

Since the cathodes of the four triodes 402 to 405 are connected to ground through the common resistor R420, the ignition of any one of the tubes will swing the cathodes of the other tubes so far positive that any subsequent positive signals on their grids are ineffective to cause ignition. These gaseous triodes thus form a means to select for utilization, the first only of the signals which may be impressed on the grids of any one of these triodes.

The signals from the upper amplifier are transmitted through its output conductor 16 to the switch U and thence to the conductor 20 during the interval that the scanning head is swung from its central position to its rightmost position and during its return to its central position, while conductor 16 is connected to the conductor 21 as the head moves from its central position to its leftmost position and as it returns to its central position. Thus, it will be seen that the output signals of the upper amplifier are impressed upon the grid of tube 402 while the UR quadrant is being scanned, and thus may energize relay UR. Similarly, signals resultant from scanning the UL quadrant will be transmitted to the grid of tube 404 and energize the relay UL; signals resultant from scanning the DR quadrant will be transmitted to the grid of triode 403 and may energize the DR relay; and signals resultant from scanning the DL quadrant are impressed upon the grid of triode 405 and may energize the DL relay.

The switches operated upon energization of the relay windings UR, UL, DR and DL determine the character of operation of the various steering controls, among these controls being those of the gyro-pilot shown in Fig. 1e. In a well known form of gyro-pilot mechanism (such as the Sperry A-3 automatic gyro-pilot) the manual adjustment of the direction of flight is controlled by three manually rotatable knobs including a knob, such as the knob 425 (Fig. 1e) which adjusts the control of the gyro-pilot upon the elevator. Turning the knob 425 to the right will depress the nose of the plane, while turning it to the left will elevate the nose of the plane relative to its previous position.

A similar knob 426 is used to adjust the control of the gyro-pilot upon the rudder. Rotating the knob 426 to the right will cause the plane to turn to the right, while turning this knob to the left will cause the plane to turn to the left. A third control knob 427 is usually provided on the control panels of automatic gyro-pilots to adjust the effect of the gyro-pilot mechanism upon the ailerons. The control is such that when the knob 427 is turned to the right the right aileron will be elevated and the left aileron depressed causing the plane to bank for a right turn, while when the knob 427 is turned to the left the plane tends to bank for a left turn.

For the purposes of the pilotless glider (and possibly for other uses of the apparatus in steering aircraft) it has been found that it is not essential separately to control the ailerons, but that the ailerons may be adjusted as an incident to the movement of the rudder. It is therefore contemplated that the rudder and aileron controls will be interconnected in a suitable manner (depending upon the design of the airplane or glider on which the apparatus is installed), so that the airplane will bank suitably for the degree of turn which should result from movement of the rudder. Such interconnection between the rudder and aileron controls is indicated by a chain or belt 428 which passes around suitable sprockets or pulleys 429 and 430 secured to the shafts of the control knobs 426 and 427 respectively. In some cases the apparatus may be mounted on a glider not equipped with ailerons, since it has been found that a well designed glider can be made to fly in a stable manner when its azimuthal course is controlled solely by the rudder, provided that changes in the azimuthal course are not made too rapidly.

In lieu of the customary gyro-pilot control mechanism, a gyroscopic control apparatus of the type disclosed in my co-pending applications Serial Nos. 463,642 and 463,643, filed October 28, 1942, may be utilized.

In the present apparatus means are provided to adjust the position of the control knobs 425 and 426 automatically in order to steer the glider or airplane. These means comprise a series motor 432 coupled to the shaft of control knob 426 by a suitable drive, diagrammatically indicated as a shaft 433, and a series motor 434 coupled to the shaft of control knob 425 in a suitable manner diagrammatically indicated as by a shaft 435. The motor 432 has a field winding 438, while the motor 434 has a field winding 440. Anti-spark resistors Rs are respectively connected in parallel with the windings 438 and 440 to reduce sparking at the switch contacts when the circuits including these windings are opened or closed. Throughout the apparatus such anti-spark resistors Rs are employed in parallel with inductive windings for the same purpose. All of such resistors, serving this purpose of reducing the sparking, are therefore designated by the same reference character, Rs. These resistors are of appropriate values, depending upon the inductance of the windings with which they are associated, from 10 to 150 ohms.

The horizontal index motor 202 (previously described with reference to Fig. 5) is shown in Fig. 1a as having a series field winding 442, while the previously described motor 196, for effecting vertical indexing of the telescope head, is illustrated in Fig. 1a as having a series field winding 444.

Associated with the gyro-pilot control panel are four signal lamps designated 446, 447, 448 and 449 which, as will hereinafter appear, are illuminated whenever the relays UR, UL, DR and DL respectively are energized.

A plurality of relays are provided (Fig. 1d) to control the various motors and effect other switching purposes: Relays L (left) and R (right) which are respectively energized when the target appears in either of the left hand or either of the right hand quadrants; relays U' (up) and D' (down) which are respectively energized when the target appears in either of the upper or either of the lower quadrants; relay ID (index down) which, when energized, causes the vertical index motor to index the head downwardly; relay IU (index up) which, when energized, causes the vertical index motor 196 to index the head upwardly; relay IL (index left) which, when energized, causes the horizontal index motor 202 to index the head to the left; and relay IR (index right) which, when energized, causes the index motor 202 to index the head to the right.

All of the relays shown in Fig. 1d are arranged to have their movable switch elements swung upwardly when energized. Thus, when a relay L is energized it closes associated switches L1, L2 and L4 and opens switches L3 and L5; relay R, when energized, closes switches R1, R2 and R4 and opens switches R3 and R5; relay U', when energized, closes switches U1, U2 and U4 and opens switches U3 and U5; relay D', when energized closes switches D1, D2 and D4 and opens switches D3 and D5; relay ID, when energized, closes switch ID2 and opens switches ID1 and ID3; relay IU, when energized, closes switch IU2 and opens switch IU3; relay IL, when energized, closes switch IL2 and opens switches IL1 and IL3; and relay IR, when energized, closes switch IR2 and opens switch IR3.

Whenever it is desired to render the apparatus operative to control the azimuthal course only of the vehicle, a rudder switch 450 (Fig. 1e) is closed, and when it is desired to have the apparatus control only the vertical direction of travel of the vehicle an elevator switch 451 is closed. In normal operation of the apparatus both switches 450 and 451 will be closed and remain closed and thus connect a +6 v. terminal respectively to the conductors 38 and 39. In fact, when the apparatus is installed on a pilotless glider, these switches may be omitted and the conductors 38 and 39 combined in a single conductor permanently connected to a +6 v. terminal.

For testing purposes it is sometimes desirable to be able to control the relays R, L, U' and D' manually, and for this purpose switches 452, 453, 454 and 455 (Fig. 1e) are provided to connect conductors 44, 56, 57 and 50 respectively to a +6 v. terminal. In normal operation of the apparatus, the switches 452 to 455 are open. In an installation of the apparatus on a pilotless glider, these switches may likewise be omitted.

Under some circumstances, it is desirable to control manually the vertical direction in which the optical system is indexed, and this is accomplished by closing a switch 456 when it is desired to index the head downwardly, and closing a switch 457 when it is desired to index the head upwardly. These switches 456 and 457 are provided mainly for initial adjustment and testing purposes and are normally open.

Similarly, it is frequently desirable to control manually the right and left indexing of the head, and this is accomplished by the operation of switches 458 and 459. Switch 458 when closed connects the conductor 62 to a +6 v. terminal, while switch 459 when closed connects the conductor 61 to a +6 v. terminal, and thereby energize relays IR and IL respectively.

A pair of double-pole single-throw switches 460—461 and 462—463 are provided to determine whether the apparatus should operate to have the airplane or glider follow a chaser course or a navigational course in azimuth, in a vertical plane, or both, these switches being open for chaser course and closed for navigational course operation.

When it is desired to swing the telescope head to its central position in the vertical plane, a double-pole single-throw vertical centering switch 464—465 is moved to closed position. This switch is open during the normal operation of the apparatus but may be closed initially to adjust the apparatus for operation.

A double-pole single-throw horizontal centering switch 466—467 is provided for causing the head to be centered on its base in a horizontal plane or in azimuth whenever the switches are closed.

A scan switch 470 is adapted to be manually operated to initially condition the scanning apparatus for operation, by connecting conductor 66 to conductor 27. The conductor 66 is connected to the positive terminal of a plate current (90 v.) battery 472 (Fig. 1d), the negative terminal of this battery being connected to ground. In using the apparatus on a pilotless glider it is frequently desirable to delay the commencement of effective operation of apparatus until a certain time interval after the glider has been released from the airplane from which it is launched. For this reason a timing mechanism 471 may be provided to close switch 470 a predetermined number of seconds after the glider has been launched. The mechanism 471 may be in the form of a spring driven clock-like escapement, a dashpot, or of any other suitable type of timing or delay device.

The timing mechanism may also be used to close the main 6 v. current supply switch 473, which, through the conductor 64, connects positive terminal of the 6 volt battery 474 (Fig. 1d) to all the terminals designated +6 v. Since the battery 474 will usually be used to supply heater current to the various electron discharge tubes, the timing device will be arranged to close switch 473 sufficiently prior to the closure of switch 470 that the tubes will be heated to operative condition when switch 470 is closed. As alternatives, switch 473 may be manually closed, or closed as an incident to the launching of the glider.

A single-pole double-throw switch 475 (Fig. 1e) when swung to the right connects the conductor 27 to the conductor 26 and will thereby cause the telescope head to scan effectively from the left to right (L-R), while when the switch is swung to the left it connects the conductor 27 to the conductor 25 and causes the head to scan from right to left (R-L). When the switch 475 is in intermediate position as shown, the telescope head will be effective to scan both L-R and R-L.

In the foregoing description of the control circuits, the various elements have been enumerated and described without endeavoring completely to coordinate their functions, since an understanding of their functions and operation requires a thoroughgoing knowledge of the principles of navigation upon which the apparatus operates. These principles have been previously alluded to and described in general terms, but the following detailed exposition of the navigational principles involved will make the subsequent description of the operation of the system as a whole more readily understandable. It is for this reason that a description of these navigational principles is interjected at this point.

The apparatus may be conditioned to cause the airplane or glider to follow (1) a simple chaser course, (2) a chaser course with precalculated windage allowance, or (3) a navigational course, or any combination of these courses with reference to azimuthal and vertical direction control, e. g., chaser course in azimuth and navigational course in the vertical plane, etc.

THE "CHASER" COURSE

The chaser course will be described with reference to Figure 19 in which a target such as a boat is represented as B, following a course B0 to B28, that is, south, and is moving at a velocity represented by the arrows along the line B0, B28. An airplane is at a point P0 at the instant that the boat is at the point B0. It is assumed that the plane travels four times as fast as the boat, as for example, the airplane having a speed of 150 M. P. H. and the boat consequently traveling at 37.5 M. P. H.

Figure 19:
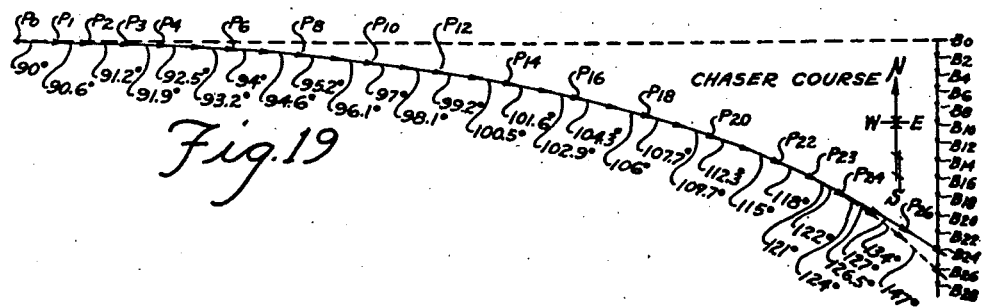
Figure 19 is a diagram illustrating the path of an airplane or glider approaching a moving target on a chaser course.

The diagram Fig. 19 is not to be considered as a conventional map but rather as a diagram in which the reference base is the air. By considering the diagram as being plotted with reference to a horizontal plane through the atmosphere, it will be clear that the drift of the plane due to wind, the drift of the boat due to wind, or tide, and the velocity of the wind relative to the boat are resolved into the single assumed condition that the boat is traveling at 37.5 M. P. H. south relative to the air, while the airplane starts out on a course directly east at a speed of 150 M. P. H. relative to the air. In a similar manner, by considering the diagram as representing a sheet of air, the movement of the boat toward and away from the airplane (if, for example, its course were in a southwesterly or southeasterly direction) can be resolved into a change in the vertical angle between the airplane and the boat.

Since the course of the airplane in a vertical plane is similar in principle to its course in azimuth, the azimuthal course only will be described.

Bearing in mind this assumption of the character of the diagram of Fig. 19, it is clear that the boat may be standing still in a 37.5 M. P. H. wind blowing from the south, or that the velocity of the wind from the south and the speed of the ship toward the south are of any other values which added together equal 37.5 M. P. H. It will also be borne in mind that the assumed speed of 37.5 M. P. H. represents the total of the two components of motion of the boat and the wind respectively in the south and north directions, and that the components of motion of the wind and of the boat in the east-west direction would be represented in a diagram similar to Fig. 19, in which the position of the boat and airplane would be plotted on a vertical plane of the atmosphere.

Let us assume that the pilot of the plane, at successive regular time intervals of short duration, steers the airplane so as to cause it to head directly toward the boat. Thus, at the end of the first time interval the boat is at the point B1 and the airplane is at the point P1 and the pilot, at this point, changes the airplane's course so that it will be headed directly toward B1. In order to accomplish this the pilot of the plane changes the plane's course from 90° to 90.6°.

At the end of the second interval the boat is at point B2 and the airplane at point P2. In order to head the airplane directly toward the boat at this instant, the pilot changes the course of the airplane from 90.6° to 91.2°. In a similar manner the pilot will progressively change the course of the airplane to cause it to follow the course indicated in the diagram. There is a limit to the angular velocity at which the airplane can execute a change in course. For the purposes of the diagram of Fig. 19, this limit is assumed to be 3° per second, and it is assumed that the time intervals between successive points P1, P2, P3, etc., are of one second duration.

When the airplane reaches a point P23 it will be on a course of 118°, but the bearing of the boat will be 122°. Since the maximum change in course which can be made by the plane during one second is 3°, the plane at point P24 is no longer capable of having its course changed to one heading directly toward the boat. Therefore the best thing the pilot can do is to change the course to 121°.

At points P24, P25 and P26 similar conditions would prevail, i. e., the bearing of the boat would in each instance be more than 3° off the course. Therefore the course of the airplane would intersect the course of the boat between the points B23 and B24 at a time when the boat was substantially at point B27. It will thus be apparent that in following a chaser course it is geometrically inevitable that the plane will miss the boat (both the boat and the plane being considered as geometrical points) unless the plane can change its direction of travel at a very high rate. To have struck the boat, the plane would have had to change its course in a manner indicated in Fig. 19 by the dotted lines commencing at P23, but such changes in course would have required nearly impossibly rapid changes in course of the airplane.

The foregoing analysis of the chaser course was on a geometrical basis, and since the boat is not a point but a target which may be several hundred feet in length, the chaser course may be useful provided the airplane is steered toward the bow of the ship and provided the distance by which the plane misses the bow of the boat is such that the plane will, nevertheless, strike the boat. A geometrical analysis of the problem will show that the distance M, in feet, by which an airplane P traveling at a velocity Vp, in M. P. H., and capable of being steered to change its course at an angular velocity $w$, in degrees per second, will miss a boat B traveling at velocity Vb, in M. P. H., may be computed by the formula:

$$M = \frac{42(Vb)^2}{w(Vp)}$$

For example, if the speed of the airplane is 210 M. P. H. and the speed of the boat 30 M. P. H. and the plane is capable of an angular change of course of 2° per second, and under the assumed condition that the plane "chases" the bow of the boat, the plane will miss the bow by a distance of 90 feet aft, which of course is satisfactory if the boat is 200 or 300 feet long.

In a similar way, the extent of the miss in the vertical plane is quite definitely determinable. The extent of this miss is, however, not of such great importance because if the airplane, or in the preferred form, a pilotless glider, is gliding at a relatively small angle of inclination to the horizontal, the airplane or glider will tend to ricochet on the water toward the boat target if it undershoots the target, or will strike somewhat above the water line and fall into the water in the event that it overshoots the target. In either event, the explosive carried by the airplane or the glider may be arranged to detonate by means of a hydrostatic pressure-operated detonating mechanism similar to that employed for the detonation of depth charges, and will be effective.

CHASER COURSE WITH WINDAGE ALLOWANCE

Figure 20:
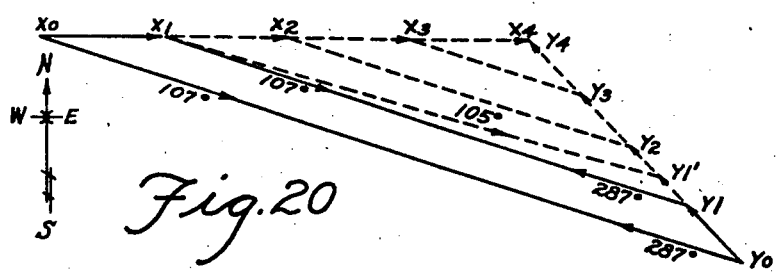
Figure 20 is a diagram to illustrate the principle of a collision course.

If there were a human pilot piloting the airplane under the initial conditions assumed with reference to Fig. 19, and the pilot initially followed the course P0, P1, P2, P3, P4, etc., he would shortly notice that in order to keep the plane heading toward the boat it would be necessary that he continuously change his course toward the right, and he would therefore, for example, at the point P4, intelligently change the course to the right more than required to cause the plane to head directly toward the boat. Thus, the plane would be pointed somewhat ahead of the bow of the boat, while the pilot would continue to sight the boat to the left of the plane's line of flight. The intelligent pilot would continue to adjust the course of the airplane until upon successive observations the boat would appear to remain a certain fixed number of degrees to the left of the plane's course. That this would be a collision course is indicated by the diagram of Fig. 20. Assume that a vessel X is at point X0 moving east, and a vessel Y is at Y0 moving northwest, these vessels moving at speeds corresponding to the length of the arrows X0—X1 and Y0—Y1 respectively. There is a point X4, Y4 on the courses of the two vessels at which the courses coincide in time and space, i. e., at which the vessels will collide. It will be noted that as both of the vessels remain on their courses the relative bearing of X to Y and vice versa does not change.

This diagram illustrates the general rule that if two vessels traveling on different courses maintain the same relative bearings with respect to each other, they are on collision courses and thus will collide unless one or the other changes its course or speed. Considering the converse of the foregoing general rule, if the vessel Y had been traveling at a greater speed and thus had arrived at point Y1' when the vessel X reached the point X1, the true bearing of the vessel Y with respect to the vessel X would have changed from 107° to 105°. If the vessel Y continues on the northwest course at the same increased speed it will be readily apparent that the vessel Y would reach the point X4, Y4 prior to the arrival at this point of vessel X. In order that the vessel X may collide with the vessel Y when the speed of Y is increased, the pilot of the vessel X would not steer his vessel more nearly toward the vessel Y but instead, would steer his vessel further away from (further to the left) of the vessel Y.

In view of the conditions described with reference to Fig. 20, it will be clear that the glider or airplane would come much closer to colliding with the target if calculations were initially made to correct for the expected "windage." "Windage" as used here is to be understood to include not only drift due to the wind, but, since the diagrams are assumed to be plotted relative to the atmosphere, windage will also include all components of the motion of both the boat and the wind which added together produce the apparent motion of the boat B in a southerly direction relative to the airplane P.

A course of this character is shown in Fig. 21 wherein the plane P is given an initial course of 104°–29'. Thus, if the plane continues on this course at an unvarying speed of 150 M. P. H. and the boat continues on its southerly course at an unvarying speed of 37.5 M. P. H., the plane would collide with the boat at a time shortly after the 26th time interval. This type of course would be ideal for a pilotless glider to follow if it were not for the fact that the wind direction and velocity may vary at different elevations, and the boat may change its speed or course at will in an endeavor to avoid being struck by the pilotless glider. Furthermore, the windage allowance would have to be accurately precalculated before the pilotless glider is released from the plane and such calculations would have to include consideration of many factors and would have to be more rapidly and more accurately performed than could be reasonably expected of the navigator and bombardier in the short time and with the limited amount of data available.

Because of these probable variations and difficulties, it is usually not feasible, if accurate results are required, to have the pilotless glider constructed to follow this type of course (as shown in Fig. 21), but instead, it is desirable that the apparatus be constructed so as, in effect, to allow for the changing "windage" at successive short intervals of time, and to correct the course of the glider accordingly. When the apparatus performs the latter functions, the glider will follow the "navigational" course. However, under many circumstances, especially if the target is stationary, reasonably accurate results may be obtained by operating the apparatus on the principle that the glider follow such chaser course with the precalculated windage allowance.

THE "NAVIGATIONAL" COURSE

The diagram of Fig. 22 illustrates the course of a pilotless glider following a navigational course, this diagram being plotted upon the general assumptions stated with reference to the diagram of Fig. 19.

In this diagram the glider or plane at the point P0, traveling due east, through its scanning apparatus "sees" the target boat B at the point B0, on a true bearing of 90°. A short time later at the point P1, the scanning head of the apparatus sees the boat at B1, which is somewhat to the right of the original 90° bearing. (The scanning apparatus will "see" the boat B in either the UR or DR quadrant, or both.) As a result the apparatus will, as will hereinafter be described, change the course of the glider from 90° to 93°. At the same time the scanning head will be indexed to the left relative to its base fixed to the glider through an angle of 2°, and as a net result, the scanning head will point in the 91° direction. When the glider reaches point P2 and the boat reaches the point B2, it will be found that the glider will still "see" the boat in one or both of the right hand quadrants, and, as a result, the course of the glider will again be changed 3° to the right to a 96° course, while the scanning head will be indexed to the left through 2° relative to the glider, and will thus point along a 92° course. At the point P3 the scanning head will "see" the boat B, then at point B3 in one or both of the left hand quadrants and will therefore, through the control apparatus, change the course of the glider 3° to the left and hence to a 93° course, while at the same time it will index the head relative to the glider 2° to the right so that the scanning head will then be directed on a 91° course. In a similar manner at successive equal time intervals, the course of the glider will be altered either 3° to the right or 3° to the left, while the scanning head will be indexed relative to the glider 2° to the left or 2° to the right. In Fig. 22 the course to which the glider is steered during successive time intervals is indicated by the upper row of figures, while the orientation of the head is indicated by the lower row of figures, the arrow studded curve indicating the actual course followed by the glider.

It will be noted that the course followed by the glider or airplane is generally similar to that of the course of the glider following the chaser course with precalculated windage correction as shown in Fig. 21, and is more nearly a straight line than the chaser course diagrammed in Fig. 19. The navigation course of Fig. 22 makes corrections, at regular intervals, for windage.

With the scanning head oscillating at 2 C. P. S., the course is corrected at least once during each cycle and thus every ½ second. Changes in windage, which could not in any event be computed prior to the start of the travel of the glider, are thus taken into account by the apparatus and appropriate corrections in the course of the glider are made at intervals in the order of ½ second. Thus, the glider will, despite substantial changes in all of the factors which account for the windage, be steered automatically toward, and will collide with, the target.

The foregoing description of the navigational course in azimuth is also followed for steering the glider or airplane in a vertical plane. Instead of changing the heading of the glider through an angle of 3° during each cycle, the angle of glide of the airplane or glider may be changed through a lesser angle in one direction and the direction of the head changed through a lesser angle in the opposite direction by the vertical indexing mechanism. The underlying principle of the navigational course in the vertical plane is, however, the same as that of the navigational course in azimuth, and the foregoing description of the azimuth course may be considered as applying in principle to the course in the vertical plane.

By following a navigational course in both the vertical plane and in azimuth, the airplane or glider will follow a three dimensional course which will inevitably cause the airplane or glider to collide with the boat or target.

While in the foregoing illustrations it was assumed that the target was a boat capable only of movement along the surface of the sea, the principles of the three different courses, namely, the chaser course, the chaser course with precalculated windage allowance, and the navigational course, will also be effective in causing the glider to collide with a target capable of movement in a vertical plane as well as movement in a horizontal plane, since motion of the target in a vertical plane appears to the glider to be the same as motion of the target having a component in a horizontal plane and in a direction directly toward or away from the glider.

CIRCUIT CONSTANTS

Appropriate values for the various circuit elements of the apparatus will be readily deducible by those skilled in the art from the foregoing description of the functions and operation of the various circuits, but for convenience the following tabulation of such constants is included. It will be understood that these values are merely given as suggested appropriate values, and that in general there may be considerable variations in the values, especially if compensatory changes are made in the values of other elements of the circuit or in the types of tubes used.

| | | | | | |
|---|---|---|---|---|---|
| Phototubes 146 to 149 | | | | | 929 |
| Preamplifier pentodes 266 and 267 | | | | | 6J7G |
| Pentodes 284, 285, 310 and 311 | | | | | 6W7G |
| Triodes 330, 331, 360, 361, 376, 377, 382, 383, 386, 387, 396, 397 | | | | | 6C8G |
| Gaseous triodes 402 to 405 | | | | | 884 |

*Resistors in megohms*

| | | | | | |
|---|---|---|---|---|---|
| R220 | 4. | R314 | .25 | R366 | .03 |
| R257 | 5. | R316 | .25 | R400 | .25 |
| R262 | 5. | R328 | .1 | R401 | .25 |
| R268 | 100. | R334 | 1. | R408 | .1 |
| R274 | .012 | R336 | .1 | R409 | .1 |
| R282 | .1 | R342 | 3. | R412 | .1 |
| R283 | .1 | R343 | 3. | R413 | .1 |
| R288 | .1 | R344 | 50. | R416 | .25 |
| R292 | .3 | R348 | .1 | R417 | .25 |
| R296 | 5. | R352 | 1. | R420 | 2. |
| R300 | 1. | R354 | .04 | R422 | .05 |
| R308 | .1 | R356 | 2. | | |

*Condensers in microfarads*

| | | | |
|---|---|---|---|
| C260 | .0008 | C338 | .1 |
| C261 | .0008 | C350 | .05 |
| C286 | .1 | C398 | .05 |
| C290 | .034 | C399 | .05 |
| C294 | .0066 | C410 | .01 |
| C312 | .05 | C411 | .01 |
| C332 | .3 | C424 | 1. |

The meshes 370 and 390 may comprise series condensers of .1 mfd., shunt condensers of .02 mfd. and shunt resistors of 1 meg., while the meshes 380 and 392 may comprise series resistors of 1 and 2 meg., and a shunt resistor of .04 meg.

OPERATION

Operation of control circuits

It has previously been pointed out that whenever the scanning or lookout apparatus "sees" any discontinuities in the light radiated from the field scanned, it will provide signals which, through the upper and lower amplifiers, will be transmitted as positive impulses to switches U and D, but that only the signals of highest amplitude will thus be transmitted by the amplifiers.

As the head oscillates it will operate the switches U and D to connect conductors 16 and 17 respectively with conductors 20 and 22 while the head is pointed to the right of its central position, and to connect conductors 16 and 17 respectively with conductors 21 and 23 during the time that the head is to the left of its central position. From the foregoing it will be clear that if the signal impulse is in the UR quadrant it will be transmitted through conductor 16, switch U and conductor 20 to the grid 406 of the gaseous triode 402, and may cause this tube to ignite and energize relay UR. Similarly, a signal received while scanning the UL quadrant will be transmitted through conductor 16, switch U and conductor 21 to the grid 407 of gaseous triode 404, and may cause the latter to ignite and energize relay UL.

In a similar manner signals of sufficiently high amplitude from the lower scanning system will be transmitted through the lower amplifier to the conductor 17, and if the source of the signal is in the DR quadrant, the signal will be coupled through the conductor 22 to the grid of gaseous triode 403, and thus may energize relay DR. If the signal is from a source in the DL quadrant it will be transmitted through conductor 17, switch D and conductor 23 to the grid of gaseous triode 405, and may energize the relay DL.

Whether the signal impressed upon the grid of any one of the triodes 402 to 405 will result in the ignition of the tube will depend upon a number of factors, since plate voltage to these triodes, supplied through the conductor 24, may be interrupted by either switch I or K and is controlled by the scan switch 470 and the R–L, L–R selecting switch 475. Let us assume that it is desired to scan L–R and that the switch 470 has been closed and switch 475 swung to the right (Fig. 1e) to connect conductor 27 to conductor 26. Conductor 26 will thus be connected to the +90 v. terminal of the battery 472. Referring now to Fig. 1a, it will be seen that switch K is operable to connect the conductor 26 to the conductor 24 throughout the time that the scanning head is to the right of its central position, but disconnects conductors 24 and 26 throughout the time that the scanning head is to the left of its central position.

Conductor 27 is connected to the +90 v. terminal upon closure of the scan switch 470 and the switch I is thus effective to supply plate voltage to the conductor 24 except at the beginning of each stroke when the switch I opens this circuit. Bearing in mind the character of the operation of the gaseous triode, namely, that having been ignited by a sufficiently positive grid signal it will remain ignited until the plate current is interrupted, it will be seen that under the assumed conditions the only time that the plate current to these gaseous triodes will be interrupted to cause their extinguishment is at the beginning of the L–R stroke. This is because at the beginning of the R–L stroke plate current is supplied through the then closed contacts of switch K which connect conductor 26 to conductor 24.

The first high amplitude positive signal impulse received from the amplifying system will cause ignition of the particular gaseous triodes 402 to 405 associated with the quadrant in which the signal source appeared, and the ignition of any one of the gaseous triodes will, as previously explained, cause the cathodes of other gaseous triodes to swing so far in the positive direction that any positive impulses subsequently impressed upon their grids will be ineffective to cause ignition. Because of this circuit arrangement it is only the first positive pulse impressed upon the grid of any one of the four gaseous triodes which is effective to ignite the triode and cause energization of its associated relay.

Under the assumed conditions, plate current supply to all of the gaseous triodes is interrupted at the beginning of the L–R stroke of the scanning head. Thus, the first positive signal will be impressed upon the grid of one of these four triodes during the L–R stroke, and the ignited triode remains conducting and prevents signals impressed on the grids of the other triodes during the remainder of a complete oscillatory cycle from having any effect.

A positive signal will be impressed upon the grid of one of the gaseous triodes 402, 405 during the L–R scanning stroke irrespective of whether or not there is any actual recognizable discontinuity in the field of radiation being scanned. This is due to the fact that the amplifying system is extremely sensitive, and if no signals are actually received from the phototubes, the amplifier will respond to signals produced due to thermal agitation (and similar causes), and will thus supply positive impulses. Of course the scanning head will always "recognize" some discontinuity in the field being scanned, and such discontinuity will be "assumed" by the apparatus to be the target.

However, the presence of an actual target in the field scanned will represent a much more prominent discontinuity so that the automatic volume control circuits of the amplifying system will promptly decrease the gain of the amplifier to a value such that the former slight discontinuities will thereafter be of so much lower amplitude that they will be "ignored," and it will be only the signal resulting from scanning the target which will be effective to produce a positive pulse in the output conductors 16 or 17, or both. The variation in gain of the amplifying system, due to the operation of the automatic volume control circuits, may be very great, in the order of 100,000 to 1.

In the foregoing description it was assumed that the switch 475 (Fig. 1e) was in its right hand position to effect scanning in the L–R direction. Assuming now that the switch 475 is moved to its left hand position to connect its conductor 25 to the conductor 27, the operation of the apparatus will be similar to that described above except that the first positive impulse received from the amplifying system during the R–L traverse of the scanning head will be effective to ignite one of the gaseous triodes 402 to 405. This is because the switch K will interrupt the plate current supply to these tubes during the time that the scanning head is to the right of its central position, and thus the interruption of the circuit through switch I will cause extinction of any ignited gaseous triode at the beginning of the R–L traversing stroke of the head.

When the switch 475 (Fig. 1e) is in its intermediate position as shown, the switch K no longer has any effect and the switch I forms the sole means for determining the interruption of plate current supply to the gaseous triodes. Since this switch interrupts the plate current at the beginning of both the L–R and R–L strokes, it will follow that the first positive pulse received from the amplifying system during the R–L as well as the L–R stroke will be effective to ignite one of the gaseous triodes. Thus, for example, in scanning a ship as a target in which the bow is pointing to the left, one of the gaseous triodes will be ignited as the bow of the ship is scanned L–R, while another gaseous triode (or the same one if the ship is completely in a single quadrant of the field) will be ignited as the stern of the ship is scanned R–L.

The effect of energization of the relays UR, UL, DR, DL will now be described. When the UR relay is energized, the closure of its switch UR1, by connecting conductor 43 to ground, completes the circuit through signal lamp 446 to provide an indication that the target was "seen" by the apparatus in the UR quadrant.

Closure of the relay switch UR2 results in completing a circuit traced as follows: From the +6 v. terminal through elevator switch 451 (Fig. 1e), conductor 39, switch UR2, conductor 57 through winding of relay U' to ground.

Closure of switch UR3 will complete a circuit traced as follows: From the +6 v. terminal through rudder switch 450, conductor 38, switch UR3, conductor 44, through winding of relay R to ground. It will thus be clear that energization of the relay UR, in addition to lighting the signal lamp 446, will energize relays U' and R.

In a similar manner, energization of relay UL will complete the circuit through signal lamp 447, and result in the energization of relays U' and L.

Likewise, energization of the relay DR will cause completion of the circuit to the signal lamp 448, and result in energization of relays D' and L.

In a similar way energization of the relay DL will cause completion of the circuit through the signal lamp 449, and result in energization of relays D' and L.

The result of energization of relays L, R, U' and D' will now be described. Let us assume that relay L has been energized as a result of energization of the relay UL, thereby closing switches L1, L2 and L4, and opening switches L3 and L5. Closure of the switch L1 will result in completion of a circuit which may be traced as follows: From conductor 38 (at +6 v.) through closed switches R3 and L1, through winding of relay L to ground, thus establishing a holding circuit for this relay.

If the switches 460—461 and 462—463 are in the open position, that is, set for a chaser course, the closure of switch L2 will not have any effect, since the conductor 45 connected to one terminal of the switch L2 leads to the open switch 462.

Opening of the switch L3 will open the holding circuit for the relay R, and the latter relay will thus be de-energized and no longer locked in operated position.

Closure of the switch L4 results in the completion of the following circuit: From a +6 v. terminal through winding 438 of motor 432 (Fig. 1e), through conductor 48, closed switch R5, conductor 47, through armature of motor 432, conductor 49 and switch L4 to ground, thereby causing the motor 432 to rotate the control knob 426 to the left.

Since the energization of relay L is an indication of the presence of a target in one of the L quadrants, the adjustment of the automatic gyro pilot control knob 426 will result in causing the latter to change the controlled course of the plane or glider toward the left. The gearing between the motor 432 and the rudder knob 426 will provide such reduction that during the interval of about one half second that this motor is energized, the turning of the rudder knob will be at a speed calling for a change of course at a rate at which the airplane or glider can safely execute the turn.

When the relay R is energized as, for example, due to the energization of relay UR, closure of the switch R1 will establish a holding or locking circuit from the conductor 38 (+6 v.) through switches L3 and R1, and relay winding R, to ground.

Closure of the switch R2 will not have any effect, since the conductor 46 leads to the open switch 463.

Opening of the switch R3 will open the locking circuit for relay L and the latter will thus no longer be locked in operated position.

Closure of the switch R4 and opening of the switch R5 will result in completion of a circuit from the +6 v. terminal, through field winding 438 (Fig. 1e) of motor 432, conductor 48, switch L5, conductor 49, armature motor 432, conductor 47, and switch R4, to ground. Since the current through the armature of motor 432 will be in the reverse direction (as compared with the direction of flow when the relay L was energized), the motor will operate to turn the control knob 426 to the right and, consequently change the gyro-controlled course of the glider or airplane to the right.

The relays U' and D' control circuits through the switches operated thereby, which are identical with the circuits controlled by the relays L and R except that these circuits are associated with motor 434, and will cause the latter to rotate the control knob 425 counterclockwise (up) when the U' relay is energized, and to rotate this control knob clockwise (down) when the relay D' is energized.

In the foregoing description, it was assumed that the switches 460—461 and 462—463 were opened to cause the plane to follow a chaser course. It will now be assumed that these switches 460—461 and 462—463 are in closed position. When, under these conditions, the relay L is energized, closure of its switch L2 will result in completion of the following circuit: From the conductor 38 (+6 v.) through switch L2, conductor 45, switch 462, conductor 62, and through winding of relay IR to ground, thus energizing the relay IR.

In a similar way energization of the relay R will result in completion of a circuit from conductor 38 (+6 v.) through switch R2, conductor 46, switch 463, conductor 61, and through winding of relay IL to ground, thereby energizing the latter relay.

Likewise, energization of relay U' will result in the completion of the circuit from conductor 39 (+6 v.) through switch U2, conductor 51, switch 460, conductor 58, and through winding of relay ID to ground, thereby energizing relay ID.

Similarly, energization of relay D' will result in completion of a circuit from conductor 39 (+6 v.) through switch D2, conductor 52, switch 461, conductor 59, and through winding of relay IU to ground, thereby energizing this relay.

It should be noted that energization of relay L causes energization of relay IR, energization of relay R causes energization of relay IL, and similarly, that energization of relay U' causes energization of relay ID, and energization of relay D' causes energization of relay IU. Since relays IL and IR control indexing of the head to the left and right respectively, and relays ID and IU control indexing of the head downwardly and upwardly respectively, it will be apparent that when the course of the plane is changed to the right, the scanning head is indexed to the left and vice versa. It will also be apparent that when the course of the plane is changed in a downward direction, the head will be indexed upwardly and vice versa, thus complying with the requisites of the navigational course above described with reference to Fig. 22.

When the relay ID is energized, the opening of the switch ID1 has no effect, since the conductor 60 leads to the normally open switch 465. The closure of the switch ID2 and opening of switch ID3 results in the establishment of a circuit traced as follows: From the +6 v. terminal, through field winding 444 (Fig. 1a), conductor 30, closed switch IU3, conductor 32, motor armature 196, conductor 31, and closed switch ID2 to ground. The motor 196 is thus energized to index the scanning head in a downward direction (decrease its elevation).

When the relay IU is energized, the following circuit is completed: From the +6 v. terminal, through field winding 444 of motor 196 (Fig. 1a), conductor 30, closed switch ID3, conductor 31, motor armature 196, conductor 32, and switch IU2 to ground. It will be noted that the current flow through the armature 196 is reversed, and therefore this motor will index the head in an upward direction, i. e., increasing its elevation.

Energization of the relay IL will have the following effects: Opening switch IL1 will not have any effect, since the conductor 63 leads to the normally open switch 467. Closure of the switch IL2 and opening switch IL3 results in the completion of a circuit traced as follows: From the +6 v. terminal, through field winding 442 of motor 202 (Fig. 1a), conductor 33, closed switch IR3, conductor 35, motor armature 202, conductor 34, and closed switch IL2 to ground.

In a similar manner energization of relay IR results in completion of the following circuit: From the +6 v. terminal, through field winding 442, conductor 33, closed switch IL3, conductor 34, motor armature 202, conductor 35, and closed switch IR2 to ground. The direction of current flow through the armature 202 is thus opposite to that in which it flows when the relay IL is energized, so that the scanning head will be indexed to the right upon energization of relay IR, and will be indexed to the left upon energization of the relay IL.

It is usually desirable before commencement of a flight controlled by the scanning apparatus (unless a chaser course with precalculated windage allowance—Fig. 20—is to be followed), to center the head both vertically and horizontally. Vertical centering of the head is accomplished by closing switches 464—465. Closing switch 465 results in the completion of the following circuit: From the +6 v. terminal, through switch 465 (Fig. 1e), conductor 60, switch ID1, conductor 59, winding of relay IU to ground. Closure of the switch 464 will result in the completion of the following circuit if the head is in elevated position and hence switch A closed: From the +6 v. terminal through switch A (Fig. 1a), conductor 29, switch 464 (Fig. 1e), conductor 58, and winding of relay ID to ground. Energization of the relay ID opens switch ID1 and thus de-energizes relay IU. Thus, relay ID is controlling over relay IU.

As previously described, the energization of relay ID causes the head to index downwardly, and energization of relay IU causes the scanning head to index upwardly. Therefore, as long as the scanning head is pointed above its center position, and the switch A thus closed, the relay ID will be energized and cause the head to index downwardly. It will continue indexing downwardly until the switch contact 234 leaves the contact plate 236, opening the switch A, whereupon relay ID will be de-energized and the resultant closure of switch ID1 will re-establish the circuit through the winding of relay IU, causing the energization of relay IU with resultant indexing of the head upwardly. As soon as the head indexes upwardly appreciably, the switch A will again be closed and the above described operation repeated. Thus, the head will remain substantially stationary at its vertical center, oscillating about this exact central position merely through a very minute angle sufficient to cause opening and closing of the switch A.

When it is desired to index the scanning head to its central position, the horizontal centering switches 466—467 (Fig. 1e) are closed. Closure of the switch 467 completes the circuit from the +6 v. terminal, through the switch 467, conductor 63, closed switch IL1, and winding of relay IR to ground.

Energization of the relay IR causes indexing of the head to the right until the switch C (Fig. 1a) is closed. Assuming that the switch C is closed, closing of switch 466 (Fig. 1e) completes a circuit as follows: From the +6 v. terminal, through switch arm 220 and contact plate 218, comprising switch C (Fig. 1a), conductor 28, switch 466, conductor 61, and winding of relay IL to ground.

Energization of relay IL opens switch IL1 and thus opens the circuit through which the winding of relay IR was energized. Energization of relay IL also causes horizontal index motor 202 to rotate in a direction to cause the scanning head to swing to the left. Thus, as long as the switch C is closed, the scanning head will index toward the left, but as soon as the head passes its central position and thus opens switch C, the energizing circuit for relay IL is broken and de-energization of this relay and resultant closure of switch IL1 completes the previously described energizing circuit for relay IR. As a result, the horizontal index motor will rotate in a direction to index the scanning head to the right until switch C again closes, and causes a repetition of the above described cycle. The head will therefore be brought to its horizontal central position and will merely oscillate through a very minute angle about this central position sufficient to cause opening and closing of the switch C.

Whenever it is desired to index the head either down, up, right or left with respect to its central position, such indexing may be accomplished by closing the appropriate switch 456, 457, 458 or 459. These switches respectively complete circuits from a +6 v. terminal to the windings of relays ID, IU, IR and IL, and cause corresponding indexing of the head, all as previously described.

TACTICAL USES OF APPARATUS

There are innumerable uses to which the apparatus as a whole, or various parts thereof, may be put. For example, the scanning head and amplifying system with some of the control circuits disclosed, or other controlling means, may be utilized to steer any type of pilotless vehicle, or vehicle carrying pilot and passengers, to a selected radiation source. The amplifying system may be utilized to amplify signals from radiation detection means other than phototubes. The steering control circuits may, instead of being controlled from the signals radiated from the source, be directly radio controlled, or may be radio controlled part of the time and radiation signal controlled the remainder of the time. Likewise, most of the control switches above described as manually operated, may be remotely controlled through radio circuits. The components of the complete system may be combined in various ways to accomplish different tactical results when applied to various vehicles. For the purposes of this description it will, however, be assumed that the apparatus as a whole is mounted in a pilotless glider which is detachably secured to an airplane.

In addition to the apparatus disclosed in this application, the glider may have a gyroscopic steering apparatus which is uncaged when the glider is released from the airplane, and which will maintain the glider on the course which it had when released from the airplane. The glider may thus be directed in the general direction of a target, be permitted to glide toward the target for a considerable distance, and the scanning control apparatus herein disclosed then rendered operative at a distance from the target such that it will be certain that the scanning apparatus will "see" the target and will not be affected by signals resultant from other lesser discontinuities in the intensity of radiation from the different portions of the field scanned.

For example, assuming good visibility, the airplane may carry the glider toward the target and the pilot or navigator will, through the use of suitable instruments, or by experience, maneuver the airplane to a position, say for example, eight miles from the target, such that the target appears in sharp contrast to its surrounding field. Assuming the target to be a boat, the pilot's selection of the direction of approach to the target will, of course, depend upon the direction that the wind is blowing the smoke from the boat, the angle at which the sun strikes the target, and the presence of other objects which constitute discontinuities in the intensity of radiation within the field surrounding the target.

In anticipation of certain conditions favoring the use of light filters, the pilot may have installed a suitable color filter over the ends of the telescope tubes, although ordinarily such procedure will be unnecessary.

Having selected his target and the most desirable angle of approach, the pilot will point his airplane toward the target (still about five miles distant). Assuming that the gyro-pilot apparatus on the glider is in operation, but with the controlling gyroscope or gyroscopes caged, the pilot or bombardier will either directly or through remote control means determine the position of the R–L, L–R switch 475, so as to condition the apparatus to scan R–L, L–R or both R–L and L–R. The switch 473 determining the application of power to the control circuits may also be closed, and assuming that the scanning head has been previously indexed to central position in both vertical and horizontal planes, the glider may be released, such release resulting automatically in uncaging the gyroscopic steering apparatus.

The glider may then glide under the control of the gyroscopic steering apparatus on the course on which it was released for a length of time sufficient for it to approach within two or three miles of the target. At this time the timing mechanism 471 is rendered operative to close the switch 470 and also the switch 473, if the latter was not previously closed, whereupon the scanning apparatus would become operative to control the subsequent direction of glide.

During the first few cycles of oscillation of the scanning head the amplifying system would be quickly conditioned by the automatic volume control triodes and circuits to respond only to the highest amplitude signals, that is, those resultant from scanning the target. As a result, control signals would be supplied to the gaseous triodes with resultant operation of their associated relays and consequent steering of the vehicle toward the target either on a chaser course or a navigational course, whichever had been preselected. If conditions make it appear to be particularly desirable, the head may be indexed prior to release of the glider through an angle precalculated to compensate for expected windage. Of course such indexing of the scanning head prior to the release of the glider would usually not be necessary or desirable when the apparatus was set to follow a navigational course.

Bearing in mind the description of the navigational course of Fig. 22, it will be clear that when the switches 460—461 and 462—463 are closed to condition the apparatus to follow the navigational course, the glider will be steered to the right through a given angle such as 3°, while at the same time the scanning head is indexed to the left through a predetermined proportionate angle such as 2°. Similarly, in the vertical plane the glider course will be changed in a downward direction through a given angle such as 1°, while at the same time the head will be indexed upwardly to a lesser proportionate angle such as 0° 40', and conversely, when the target appears in one of the upper quadrants the plane will be steered upwardly through 1° and the scanning head indexed downwardly through an angle of 0° 40'. Of course in the case of the glider, there is a limit to the glide angle at which the glider will maintain flying speed, and the elevator controls on the glider will therefore be provided with means to prevent the elevator from being swung upwardly to an extent which would cause the glider to stall.

When it is desired to have the glider follow a chaser course, the switches 460—461 and 462—463 are not closed, and as a result, the indexing motors 196 and 202 will not be energized at any time during the flight. The apparatus will therefore operate to steer the glider along a chaser course such as shown in Fig. 19. For example, whenever the scanning apparatus and amplifying system supplies a signal to the control circuits indicating that the target is in the UR quadrant, the relay UR, and consequently the relays U' and R, will be energized in the manner previously described.

The ultimate effect of the operation of these relays will be to adjust the positions of the control knobs 425 and 426. Due to the provision of the locking circuits for the relays L, R, U' and D', the motors 434 and 432 which operate the control knobs 425 and 426 will be energized for approximately one half second each time that one of the Thyratrons 402 to 405 is tripped, provided the switch 475 is set for either R–L or L–R scanning, and for a period of approximately .25 second if the switch 475 is in its intermediate position in which the scanning is both R–L and L–R.

Thus, the course of the glider will be changing either to the right or to the left and either up or down throughout its flight, but the rate of change of its course will be a constant angular velocity depending upon the aerodynamic characteristics of the glider or airplane. The angular velocity at which the direction of flight of the glider or airplane is changed should of course be well within the limits of its maneuverability, and within which its flight is reliably stable. The particular angular velocity at which the course of the glider or airplane is changed will of course depend upon many factors in addition to its aerodynamic characteristics, such as its gliding speed, the expected speed or "windage" of the target, the frequency of oscillation of the scanning head, and the responsiveness and effectiveness of the directional controls of the glider or airplane.

When conditions are such that a fairly accurate estimate of the expected windage may be precalculated, the scanning head may be indexed by operation of one or more of the switches 456–459 to set the head in the angular position necessary to precompensate for the expected windage, such operation of course being performed prior to release of the glider. The glider will of course glide to the target with the controls operating in the same manner as above described with reference to the chaser course, but the actual course of the glider will be that shown in Fig. 21 if the windage allowance was correctly precalculated (and provided none of the factors upon which the windage calculations were based changed during the flight).

It will be appreciated of course that if it were possible to precalculate the windage allowance (in both the horizontal and the vertical planes) with perfect reliability, it would not be necessary to have the glider equipped with the scanning apparatus but it would be necessary merely to have the gyro-pilot controls set to cause the glider to follow the precalculated course.

However, the windage allowance cannot ordinarily be precalculated with any great degree of reliability, especially when the target is a moving object such as a boat which is being maneuvered to avoid being struck by the glider. Since there are so many changing factors entering into the calculation of the expected windage, it is difficult to conceive of a pilot, navigator, or bombardier being able to precalculate the expected windage with reasonable reliability within the short time available to him for making his observations and calculations. However, if the scanning head is indexed to make a rough allowance for estimated expected windage, and the scanning head is utilized to correct this estimated allowance periodically during the course of the flight, the probability of the glider striking the target may be slightly improved.

By providing a suitable radiation source at an airport or on an aircraft carrier, the steering control apparatus of the character herein disclosed, may be used to assist the pilot in making a landing. In addition to its military use the apparatus may be utilized to cause a glider released from an airplane to land with its cargo at a designated point on the terrain which may be indicated by a source of light or other radiation. Other uses of the complete apparatus, or various parts thereof, for securing indications of a radiation source or for steering various types of vehicles, etc., will readily suggest themselves to those skilled in the art.

SUMMARY

From the foregoing description it will appear that the apparatus of the invention has a number of important features which contribute materially to the effectiveness of the system as a whole. Among these are:

(1) The angular dimensions of the field of view of the phototubes are small, i. e., each phototube receives radiation from an area of .5° in width and 4.5° in height.

(2) Each pair of phototubes is arranged in push-pull so as to improve the sensitivity to changes in intensity of radiation.

(3) Changes in intensity of radiation from the scanned field which extend a considerable distance across the field (such, for example, as would result from the differences in illumination from the sky and the sea if the rectangular field scanned were at an angle to the horizon) do not result in the transmission of a signal through the amplifying system, since the latter is provided with a number of high pass filter sections which block the transmission of the low frequency signals which would result from scanning a field of this type.

(4) When the apparatus is distant from the target and the signals due to differences in intensity of radiation from the target and surrounding field are slight, the amplifier is extremely sensitive, but as the distance between the apparatus and the target becomes less, the sensitivity of the amplifier becomes less, so that the signals resultant from radiation of objects other than the target are not transmitted through the amplifier. This is due to the three stages of automatic volume control triodes by which the gain of the amplifying system may be changed by a factor of the order of 100,000 to 1.

(5) Scanning is effected in a horizontal direction only, while indications are nevertheless provided as to position of the target in the vertical direction. By this method of scanning, as contrasted with the one in which the scanning is vertical, or has a vertical component, improved results are obtained because the instantaneous area scanned does not ordinarily transit the horizon, and thus there is, due to this cause, no abrupt discontinuity in the intensity of radiation received.

(6) By providing two stages of radiation responsive devices scanning adjacent (and over-lapping) rectangular areas, the scanned field may, in effect, be divided into four quadrants, and a reliable signal obtained indicating the quadrant in which the target is located.

(7) By having separate amplifiers for the scanning devices for the upper and lower quadrants respectively, and providing the corresponding automatic volume control stages of both amplifiers with common sources of biasing potential, the two amplifiers are maintained at substantially equal sensitivity at all times. As a result, the signal of maximum amplitude resultant from scanning the target is the only effective signal, irrespective of the amplifier through which the signal is transmitted.

(8) The amplitude of the signal transmitted to the automatic volume control stages of the amplifiers is limited so that when the apparatus approaches closely to the target and thus receives a number of very high amplitude signals, the amplifier will no longer select the highest amplitude signal for transmission, but instead, will transmit all of the signal impulses at equal amplitude so that by means of the gaseous triodes only the first of these equal amplitude signals received during a scanning cycle may be utilized for control purposes.

(9) The signals from the amplifier are automatically switched (by the switches D and U) to the control circuits represented by the gaseous triodes in a manner such that the triode which is ignited corresponds with the particular quadrant of the scanned field in which the signal originating target appeared.

(10) The gaseous triodes are so arranged in the circuit that the first to receive a tripping signal on its grid will ignite, and thereby immediately bias the other gaseous triodes sufficiently to prevent their ignition by any subsequent signals received during a particular scanning cycle.

(11) The ignited gaseous triode is automatically extinguished at least once during each cycle, either at the beginning of the R–L scanning stroke, the L–R scanning stroke, or both the R–L and L–R scanning strokes.

(12) Only four thyratrons or gaseous triodes are required, each by its energization indicating the presence of the target in its associated one of the four quadrants of the scanned field, each such triode thus providing an indication of two significant facts, i. e., whether the target is to the right or left of the center of the scanned field or is above or below the center of the scanned field.

(13) Each of the relays (UR, UL, DR and DL) controlled by the gaseous triodes controls the energization of at least two additional relays (U' and R, U' and L, D' and R, and D' and L respectively), and one of each coordinate pair (L and R, U' and D') of the latter relays is energized at all times during the operation of the apparatus due to the provision of locking circuits, and as a result, the steering control motors 432 and 434 are always in operation, rotating in one direction or the other.

(14) Control circuits and relays are provided to cause proportional indexing of the scanning head with each change in course of the controlled vehicle, so that the vehicle may follow a navigational course as described.

(15) The scanning head may be readily indexed to the right, to the left, up, or down, or indexed to move to and maintain a central position in either or both the vertical and horizontal planes merely by the operation of appropriate switches.

(16) Merely by the appropriate setting of a switch (475) the apparatus can be conditioned for scanning R–L or L–R, or both R–L and L–R.

More specifically, some of the important features of mechanical and electrical construction are as follows:

(17) Oscillation for scanning is provided by a very simple switch and solenoid mechanism which is stable as to frequency of oscillation and reliable as to smoothness and extent of oscillation.

(18) The telescope tubes are constructed with light baffles which effectively prevent light from sources other than the field being scanned from affecting the phototubes.

(19) The electrical connections between the oscillating portion of the scanning mechanism and the support therefor, is provided by balanced bowed resilient strips which are arranged to apply compensatory forces.

(20) Simple means are provided to divide the light entering each of the light slits into two rays having equivalent effects upon the two phototubes to which the rays of light are directed by reflection.

(21) The construction of the switches, D, U, and K, is such that it is only for the briefest instant as the scanning head passes its center position that both switches are closed, so that the opening of one pair of contacts of each switch mechanism is substantially simultaneous with the closing of its other pair of contacts.

(22) The resilient means for applying the centralizing force to the oscillating telescope tubes is frictionless, except for the negligible internal friction in the springs and the friction due to movement of the springs through the air.

The amplifier and the control circuits are not claimed herein but form the subject matter of copending divisional applications Serial No. 511,916 filed November 27, 1943, and Serial No. 546,762 filed July 27, 1944, respectively.

While but a single embodiment of the invention is herein disclosed, it will be apparent to those skilled in the art that the invention is capable of embodiment in a large variety of modified forms without departing from the underlying principles of the invention. The following claims are therefore intended to include within their scope not only the particular embodiment disclosed, but also such modifications and variations by which substantially the results of the invention may be obtained by the use of substantially the same or equivalent means.

I claim:

1. In a scanning apparatus for detecting discontinuities in intensity of radiation in different portions of the field scanned, the combination of a pair of radiation responsive elements, means to concentrate radiation from contiguous vertically elongated areas of the field respectively upon said elements, and scanning mechanism connected to said means for moving said elongated areas laterally to traverse a generally rectangular horizontal field.

2. The combination set forth in claim 1 in which said elements are photocells, and said concentrating means comprises a condensing lens system, means forming a light slit, and means having radiation dividing and reflecting surfaces to cause radiation from the contiguous areas to reach said elements.

3. The combination set forth in claim 1 in which the radiation from the contiguous areas is segregated by means of a member having a vertical rectangular slit, and a prismatic reflector is provided to divide the radiation passing through said slit into two beams of equivalent effectiveness on said elements respectively.

4. In a radiation detection apparatus, the combination of a pair of radiation responsive devices capable of translating the radiation received into electrical signals, means for focusing radiation from two adjacent areas upon said devices respectively, electrical circuit means coupled to said devices for comparing the amplitudes of the electrical potentials produced by said devices and to provide an electrical impulse when said potentials differ, cyclically operating means for causing said devices to scan a field containing sources of radiation, and means coupled to the devices to segregate the electrical impulses produced when scanning one portion of the scanned field from the impulses produced when scanning another portion of the scanned field.

5. The method of detecting variations in the intensity of radiation from incremental sections of an area to be scanned which comprises directing radiation from two closely adjacent sections of the area to two separate instrumentalities responsive to the radiation and capable of translating the radiation intensity into an electrical potential of value related to the radiation intensity, scanning the area by causing the sections of the area from which radiation is transmitted to said instrumentalities to traverse the area periodically, and registering the occurrence of substantial differences in the electrical potentials produced by the two instrumentalities.

6. In a radiation responsive apparatus, the combination of two radiation responsive devices, means to cause said devices to scan contiguous generally rectangular areas having their longitudinal axes parallel and horizontal, and means coupled to said devices and driven by said means to segregate signals generated by said devices during their scanning of the right hand portions of their respective scanned areas from the signals produced while the devices are scanning the left hand portions of their respective scanned areas, whereby said devices provide indications of the quadrant of the whole field scanned in which a source of radiation is located.

7. The combination set forth in claim 6 in which said devices have their scanned rectangular areas overlapping but not coinciding.

8. In a radiation responsive apparatus, the combination of two radiation responsive devices, first means to cause said devices to scan a generally rectangular field, and means coupled to said devices and driven by said first means to segregate signals generated by said devices during their scanning of the right hand portion of the field from the signals produced while the devices are scanning the left hand portion of the field.

9. In an apparatus for detecting discontinuities in radiation intensity in an extended field of view, a pair of radiation responsive devices, means to render said devices respectively responsive to radiation from laterally contiguous elongated rectangular areas of view, mechanical means connected to said devices to oscillate them and thereby effect scanning of a space represented by a generally rectangular field traversed by the lateral sweep of said rectangular areas of view, and signal producing means connected to and controlled by said devices in response to differences in the intensity of the radiation received by said devices from their respective areas of view.

10. In a scanning apparatus, the combination of a relatively fixed base, a frame mounted for azimuthal rotation relative to said base on a vertical axis, a gimbal pivotally mounted in said frame on a horizontal axis, a scanning head mounted in said gimbal for oscillation in a normally horizontal plane, power means connected between said gimbal and said head for oscillating said head, electric motor driven gear means connected between the frame and base for indexing said frame with respect to said base, and electric motor driven gear means connected between the gimbal and the frame for indexing said gimbal with respect to said frame.

11. The combination set forth in claim 10, in which a contact switch operably connected between the frame, and the base operates to close when said frame is indexed to one side of its central position and to open when it is indexed to the other side of its central position, in which at least one of said electric motor driven gear means includes a reversible motor, and in which said contact switch is connected in a selectively operable energizing circuit for said reversible motor and is effective to cause said motor to rotate in one direction when the contact switch is closed and to rotate in the opposite direction when the contact switch is open, whereby said scanning head may readily be indexed to its central position.

12. In a scanning apparatus, the combination of a relatively fixed base, a frame mounted for rotation on said base about a vertical axis of the base, a gimbal pivotally mounted in said frame on a horizontal axis of the frame, a scanning head mounted in said gimbal for oscillation in a normally horizontal plane of the base, power means connected between said gimbal and said head for oscillating said head, remotely controllable motor means connected between the frame and base for indexing said frame with respect to said base, and remotely controllable motor means connected between the gimbal and frame for indexing said gimbal with respect to said frame.

13. In a radiation detection apparatus, the combination of a telescope tube having a condensing lens system at one end and a light slit at the other end, said light slit being located near the focus of the condensing lens system, a member providing a pair of reflecting surfaces meeting at a line edge adjacent said light slit on the side opposite said condensing lenses, said reflecting surfaces diverging at a substantial angle, a pair of photoelectric cells each positioned to receive radiation transmitted through said slit and reflected by one of said reflecting surfaces, and means for adjustably positioning said member about an axis parallel to its reflecting surfaces, thereby to determine the relative proportion of the light passing through said slit which will be directed to each of said photoelectric cells.

14. In a radiation detection apparatus, the combination of a telescope tube having a condensing lens system at one end and a light slit at the other end, said light slit being located near the focus of the condensing lens system, means providing a pair of reflecting surfaces meeting at a line edge adjacent said light slit on the side opposite said condensing lenses, said reflecting surfaces diverging at a substantial angle, a pair of photoelectric cells positioned to receive radiation transmitted through said slit and reflected by said reflecting surfaces respectively, and a light baffle structure connected to said telescope tube and having a plurality of spaced annular baffles providing openings of successively decreasing diameter, the baffle of the smallest size opening being nearest the condensing lens system, said baffles being in the form of thin sheets having a dull black finish.

15. In an apparatus for detecting discontinuities in the intensity of radiation from portions of an extended field, two pairs of radiation responsive devices, the devices of each pair respectively arranged to be responsive to radiation from laterally contiguous elongated rectangular areas of the field, the areas related to one pair of said devices being in longitudinal alignment with the areas related to the other pair of said devices, means to cause said devices to scan a space represented by a generally rectangular field traversed by the lateral sweep of the rectangular areas, an amplifier associated with each pair of said devices to amplify the signals generated thereby, and means common to said amplifiers for maintaining the respective gains thereof substantially equal and operative to decrease the gain of both amplifiers as the amplitude of the signal supplied by said devices to either of the amplifiers increases, whereby said amplifiers are controlled to transmit only the highest amplitude signals produced by said devices irrespective of the pair of devices from which the signals emanated.

16. In a scanning apparatus having a radiation condensing means and radiation responsive means, the combination of a casing for carrying at least one of said means, a support, means for oscillating said casing relative to said support comprising, a pair of solenoids having plungers, a parallelogram linkage connecting said plungers and said casing, a source of electrical energy, switch means operated by relative movement of said casing and said support alternately to connect said solenoids to said source respectively during opposite oscillatory strokes of said casing, and resilient means applying a restoring force resisting movement of said casing in either direction from its central position.

17. The combination set forth in claim 16 in which frictional buffer means are provided between the casing and the support to retard the movement of said casing toward the ends of its oscillatory strokes.

18. In a scanning apparatus having a support and a casing mounted for oscillation with respect to the support, said casing including electrical components, other electrical components not carried in said oscillatory casing, means providing electrical connections between the components in said casing and the components not oscillating therewith comprising, a plurality of thin flexible resilient strips having bights formed therein and each having one end fixed to said casing and its other end fixed to said support, said strips being flexed upon relative oscillatory movement of said casing and said support.

19. In a scanning apparatus having a support and a casing mounted for oscillation with respect to the support, said casing including electrical components, other electrical components not carried in said oscillatory casing, means for providing an electrical connection between the components in said casing and the components not oscillating therewith comprising, a plurality of thin flexible resilient strips having bights formed therein and each having one end fixed to said casing and its other end fixed to said support, said strips being arranged symmetrically with respect to a plane perpendicular to the plane of oscillation of the casing and central with respect to the arc of oscillation and being flexed upon relative oscillatory movement of said casing and said support.

LAURENS HAMMOND.